US008570600B2

(12) United States Patent
Harada

(10) Patent No.: US 8,570,600 B2
(45) Date of Patent: Oct. 29, 2013

(54) IMAGE FORMING APPARATUS

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 107 days.

(21) Appl. No.: 13/283,883

(22) Filed: Oct. 28, 2011

(65) Prior Publication Data

US 2012/0105880 A1 May 3, 2012

(30) Foreign Application Priority Data

Oct. 29, 2010 (JP) ................................. 2010-243986
Oct. 29, 2010 (JP) ................................. 2010-243987

(51) Int. Cl.
*H04N 1/60* (2006.01)

(52) U.S. Cl.
USPC .............. 358/1.9; 358/2.1; 358/518; 358/522

(58) Field of Classification Search
None
See application file for complete search history.

(56) References Cited

U.S. PATENT DOCUMENTS

| | | | | |
|---|---|---|---|---|
| 6,028,958 | A * | 2/2000 | Kanamori | 382/171 |
| 6,567,544 | B1 | 5/2003 | Kanno et al. | |
| 7,317,829 | B2 * | 1/2008 | Herley | 382/171 |
| 7,570,403 | B2 * | 8/2009 | Sawada | 358/522 |
| 8,315,460 | B2 * | 11/2012 | Hwang et al. | 382/176 |
| 8,401,290 | B2 * | 3/2013 | Taylor et al. | 382/172 |
| 2005/0201620 | A1 * | 9/2005 | Kanamoto et al. | 382/182 |
| 2007/0291288 | A1 * | 12/2007 | Campbell et al. | 358/1.9 |
| 2008/0030814 | A1 * | 2/2008 | Ohara et al. | 358/522 |
| 2009/0066802 | A1 * | 3/2009 | Itagaki | 348/222.1 |
| 2009/0268225 | A1 | 10/2009 | Sugiyama | |
| 2009/0310149 | A1 * | 12/2009 | Kawasaki | 358/1.8 |
| 2013/0004066 | A1 * | 1/2013 | Butler et al. | 382/165 |

FOREIGN PATENT DOCUMENTS

| | | |
|---|---|---|
| JP | 5-284372 | 10/1993 |
| JP | 8-297390 | 11/1996 |
| JP | 2003-219191 | 7/2003 |
| JP | 2009-198792 | 9/2009 |
| JP | 2009-266118 | 11/2009 |

OTHER PUBLICATIONS

Japanese Office Action of Apr. 2, 2013.

* cited by examiner

*Primary Examiner* — Dung Tran
(74) *Attorney, Agent, or Firm* — Gerald E. Hespos; Michael J. Porco; Matthew T. Hespos

(57) ABSTRACT

An image forming apparatus includes an image data acquisition unit, a frequency distribution acquisition unit, and a color setting unit. The image data acquisition unit acquires image data representing a color image. The frequency distribution acquisition unit allocates a color of each pixel of the data as a class and acquires a frequency distribution representing an occurrence rate of the color based on the data acquired by the image data acquisition unit. The color setting unit sets a first color with the highest frequency distribution occurrence rate as a background color in the color image, sets a second color with an occurrence rate next in magnitude to the first color as a character color in the color image, and sets a color with an occurrence rate lower than that of the second color as a pattern color that is a color of a specific pattern in the color image.

20 Claims, 18 Drawing Sheets

IMAGE FORMING APPARATUS

BACKGROUND OF THE INVENTION

1. Field of the Invention

The present invention relates to an image forming apparatus that forms color images.

2. Description of the Related Art

Among image forming apparatuses such as printers, copiers, and all-in-one machines, those provided with a color printing mode and a monochromatic mode have been known. Further, a full-color mode and a two-color color mode are known as color printing modes.

In the full-color mode, printing is performed using all of the color toners provided in the image forming apparatus, and in the two-color color mode, printing is performed using a black toner and one chromatic color (specific color) other than black. A chromatic color is obtained by mixing a plurality of chromatic color toners.

In the above-described image forming apparatus, the two-color color mode is implemented in the below-described manner.

The above-described image forming apparatus is provided with a plurality of color component counter units having, for example, blue, green, and red color components allocated one by one thereto. Each color component counter unit counts the number of pixels of the color allocated to the color component counter unit from among a plurality of pixels included in image data.

Then, the above-described image forming apparatus sets the color corresponding to the color component counter unit with the highest count value as the specific color (one specific color). The image forming apparatus then prints the black portions of the image data with black and prints the color portions by using the specific color that has thus been set.

In business documents, black characters constitute a major portion of the document, and only a logo mark, which is a company mark, is often printed in a chromatic color. This is because the color of the logo mark is an important element representing the company. Further, only underlining lines and markers in the black text document are also often printed in a chromatic color.

Since the logo mark color is often the corporate color representing the specific company, the user needs this logo mark color to be truthfully reproduced on the paper. It is also desirable that the underlining lines and markers be truthfully reproduced.

The following problems are encountered when a document in which only a pattern such as a logo mark, underlining lines, and markers are printed in a chromatic color is printed in a two-color color mode in the above-described image forming apparatus.

Thus, since the above-described image forming apparatus prints the color portion by using the color corresponding to the color component counter unit with the highest count value, the color that can be used for printing the color portion is limited to any of the colors that have been allocated to the color component counter portions in advance.

For this reason, even when the original color image that is to be printed uses only one color other than black, a difference in hue can occur between the color of the color portion in the original color image and the color of the color portion actually printed in the two-color color mode.

SUMMARY OF THE INVENTION

It is an object of the present invention to provide an image forming apparatus that can increase reproducibility of the color of the pattern when the image including the pattern of a chromatic color is printed.

An image forming apparatus according to one aspect of the present invention includes an image data acquisition unit, a frequency distribution acquisition unit, and a color setting unit. The image data acquisition unit acquires image data representing a color image. The frequency distribution acquisition unit allocates a color of each pixel of the image data as a class and acquires a frequency distribution representing an occurrence rate of the each color on the basis of the image data acquired by the image data acquisition unit. The color setting unit sets a first color that is a color with the highest occurrence rate in the frequency distribution acquired by the frequency distribution acquisition unit as a background color in the color image, sets a second color that is a color with an occurrence rate next in magnitude to the first color as a character color in the color image, and sets a color with an occurrence rate lower than that of the second color as a pattern color that is a color of a specific pattern in the color image.

DETAILED DESCRIPTION OF THE PREFERRED EMBODIMENTS

Figure 1:
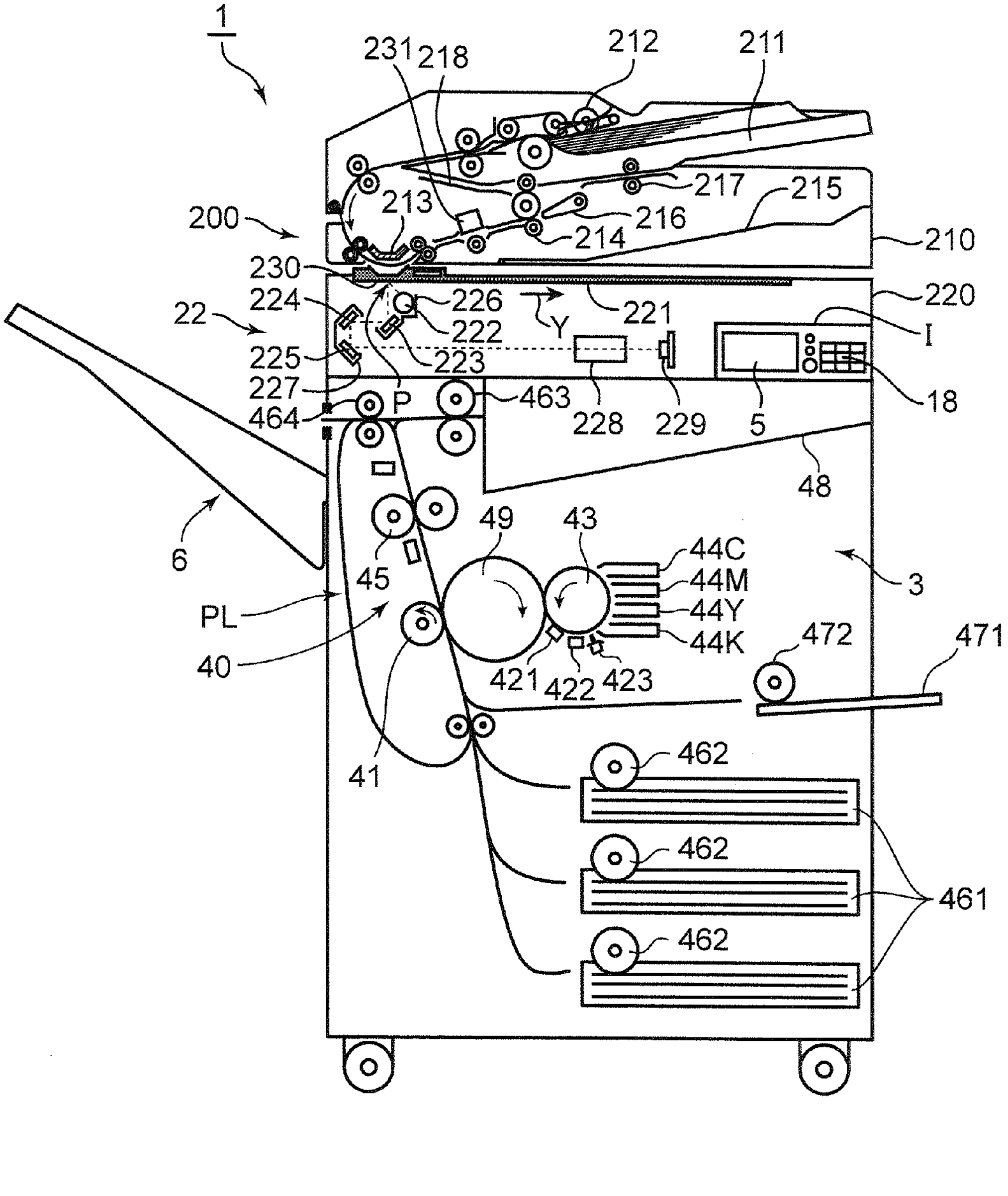
FIG. 1 is a schematic cross-sectional view of the image forming apparatus according to one embodiment of the present invention.

Embodiments of the present invention will be described below with reference to the appended drawings. In the drawings, like components will be assigned with like reference numerals and the explanation thereof will be herein omitted. In the embodiments explained hereinbelow, a color image forming apparatus performing full color printing by using cyan (C), magenta (M), yellow (Y), and black (K) color toners will be explained by way of example.

The image forming apparatus may also perform full color printing by using red, green, blue, and black color toners.

First Embodiment

FIG. 1 is a schematic cross-sectional view of the image forming apparatus according to one embodiment of the present invention. The image forming apparatus 1 is provided with an image reading unit 200 and an image forming main body unit 22. The image reading unit 200 is constituted by a document feed unit 210, a scanner unit 220, a CIS 231, a user interface unit I arranged so as to be exposed on the front surface of the image forming main body unit 22, and the below described reverse mechanism.

The document feed unit 210 is provided with an ADF (Automatic Document Feeder) and has a document tray 211, a pick-up roller 212, a platen 213, a discharge roll 214, and a discharge tray 215. The documents that are the reading objects are placed on the document tray 211. The documents placed on the document tray 211 are picked up one by one by the pick-up roller 212 and successively conveyed via a gap to the platen 213. The documents that have passed over the platen 213 are successively discharged to the discharge tray 215 by the discharge roller 214.

A timing sensor (not shown in the figure) that detects paper sheets is arranged at a predetermined position before the reading position P in the document conveying path, from among the positions facing the circumferential surface of the platen 213, and the timing of the document conveying to the reading position P is determined on the basis of the output request of the timing sensor. The timing sensor is constituted, for example, by a photo-interrupter.

The scanner unit 220 optically reads the images of the documents and generates image data. The scanner unit 220 is provided with a glass 221, a light source 222, a first mirror 223, a second mirror 224, a third mirror 225, a first carriage 226, a second carriage 227, an image converging lens 228, and a CCD (Charge Coupled Device) 229.

The scanner unit 220 uses a white color fluorescent lamp such as a cold-cathode fluorescent lamp as the light source 222, and the light from the document is guided to the CCD 229 by the fist mirror 223, second mirror 224, third mirror 225, first carriage 226, second carriage 227, and image converging lens 228. The scanner unit 220 is constituted using a white color fluorescent lamp such as a cold-cathode fluorescent lamp as the light source 222. Therefore, color reproducibility is better than in the case of the below-described CIS 231 using a three-color LED (Light Emitting Diode) as a light source.

The user manually places the document on the glass 221 when the document is read without using the document feed unit 210. The light source 222 and the first mirror 223 are supported by the first carriage 226, and the second mirror 224 and the third mirror 225 are supported by the second carriage 227.

The document reading system of the image reading unit 200 can be of a flat bed reading mode in which the document placed on the glass 221 is read by the scanner unit 220 and an ADF reading mode in which the document is introduced by the document feed unit 210 (ADF) and the document is read in the conveying process.

In the flat bed reading mode, the document placed on the glass 221 is irradiated by light from the light source 222, and the reflected light of one line in the main scanning direction is successively reflected by the first mirror 223, second mirror 224, and third mirror 225 and falls on the image converging lens 228. The image of the light incident upon the image converging lens 228 is formed on the light receiving surface of the CCD 229.

The CCD 229 is a one-dimensional image sensor which copies and processes image data of the document corresponding to one line. The first carriage 226 and the second carriage 227 are configured to be capable of moving in the directions perpendicular to the main scanning direction (sub-scanning direction, direction of arrow Y), and when the reading of one line is completed, the first carriage 226 and the second carriage 227 move in the sub-scanning direction and the next line is read.

In the ADF reading mode, the document feed unit 210 uses the pick-up roller 212 to pick up one by one the documents placed on the document tray 211. In this case, the first carriage 226 and the second carriage 227 are arranged in a predetermined reading position P that is located below the reading window 230.

When the document passes above the reading window 230 provided in the conveying path from the platen 213 to the discharge tray 215 while the document is being conveyed by the document feed unit 210, the document is irradiated by the light source 222 and the reflected light of one line in the main scanning direction is successively reflected by the first mirror 223, second mirror 224, and third mirror 225 and falls on the image converging lens 228. The image of the light incident upon the image converging lens 228 is formed on the light receiving surface of the CCD 229. The document is then conveyed by the document feed unit 210 and the next line is read.

The document feed unit 210 has a reverse mechanism provided with a switching guide 216, a reverse roller 217, and a reverse conveying path 218. The reverse mechanism turns over the document that has been read on the front surface in the ADF reading process of the first cycle and again conveys the document to the reading window 230, thereby making it possible to read the back surface of the document with the CCD 229.

The reverse mechanism operates only in a two-side reading mode and does not operate in a one-side reading mode. After one-side reading and reading of the back surface in two-side reading, the switching guide 216 is switched upward and the document that has passed by the platen 213 is discharged by the discharge roller 214 to the discharge tray 215.

After front surface reading in the two-side reading mode, the switching guide 216 is switched downward and the document that has passed by the platen 213 is conveyed by the reverse roller 217 to the reverse conveying path 218. The switching guide 216 is thereafter switched upward, the reverse roller 217 rotates in reverse, and the document is again fed to the platen 213. The mode in which both surfaces of the document are read by using the reverse mechanism will be referred to as a two-side reverse reading mode.

In the image reading unit 200, the back surface of the document can be read by the CIS 231 substantially in parallel with reading of the front surface of the document by the CCD 229 (scanner unit 220) in the document conveying process during the ADF reading mode. In this case, the front surface of the document that has been conveyed from the document tray 211 by the document feed unit 210 is read by the CCD 229 when the document passes above the reading window 230, and the back surface is read when the document passes by the installation location of the CIS 231. RGB three-color LEDs are used as a light source in the CIS 231.

By using the CCD 229 and the CIS 231 in the above-described manner, it is possible to read the front and rear surfaces of the document in one-cycle (one-pass) document conveying operation performed by the document feed unit 210 from the document tray 211 to the discharge tray 215. The mode in which both surfaces of the document are read by using the CCD 229 and the CIS 231 will be referred to as a two-side simultaneous reading mode.

The two-side reverse reading mode and the two-side simultaneous reading mode are provided as reading modes in which two-side reading of the document is performed by using the ADF reading mode. The two-side reverse reading mode is used when the quality of printed images on both sides is wished to be matched, and the two-side simultaneous reading mode is used when the shortening of reading time is a priority, even if there is a difference in quality between the printed images of the two sides. The image forming apparatus 1 is initially set to the two-side simultaneous reading mode, and the image reading operation of the document is performed in the two-side simultaneous reading mode when the image forming instruction is inputted without performing any mode setting operation with respect to the reading mode.

The image forming apparatus 1 has the image forming main body unit 22 and a stack tray 6 provided on the left side of the image forming main body unit 22. The image forming main body unit 22 is provided with a plurality of paper sheet feed cassettes 461, a feed roller 462 that supplies the paper sheets one by one from the paper sheet feed cassettes 461 and conveys the paper sheets to the image forming unit 40, and the image forming unit 40 that forms an image on the paper sheet conveyed from the paper sheet feed cassette 461. The image forming main body unit 22 is provided with a feed tray 471 and a supply roller 472 that supplies one by one the documents placed on the feed tray 471 toward the image forming unit 40.

The image forming unit 40 is provided with a charge neutralization device 421 that removes residual charges from the surface of a photosensitive drum 43, a charging device 422 that charges the surface of the photosensitive drum 43 after charge neutralization, an exposure device 423 that outputs a laser beam on the basis of image data acquired by the scanner unit 220, exposes the surface of the photosensitive drum 43, and forms an electrostatic latent image on the surface of the photosensitive drum 43, development devices 44K, 44Y, 44M, 44C that form toner images of cyan (C), magenta (M), yellow (Y), and black (K) colors on the photosensitive drum 43 on the basis of the electrostatic latent image, a transfer drum 49 that transfers and superimposes the toner images of each color that have been formed on the photosensitive drum 43, a transfer device 41 that transfers the toner images located on the transfer drum 49 onto a paper sheet, and a fixing device 45 that heats the paper sheet onto which the toner images have been transferred and fixes the toner images to the paper.

The supply of toners of cyan, magenta, yellow, and black colors is performed from toner cartridges (not shown in the figure). Further, conveying rollers 463, 464 are provided to convey the paper sheet that has passed through the image forming unit 40 to the stack tray 6 or discharge tray 48.

When an image is formed on both sides of a paper sheet, the image is formed on one surface of the paper sheet in the image forming unit 40, and the paper sheet is then nipped by the conveying roller 463 on the discharge tray 48 side. The conveying roller 463 is reversed in this state, switchback of the paper sheet is performed, the paper sheet is carried to the paper conveying path PL, and again conveyed to the region upstream of the image forming unit 40. After the image has been formed on the other surface of the paper sheet by the image forming unit 40, the paper sheet is discharged to the stack tray 6 or discharge tray 48.

Figure 2:
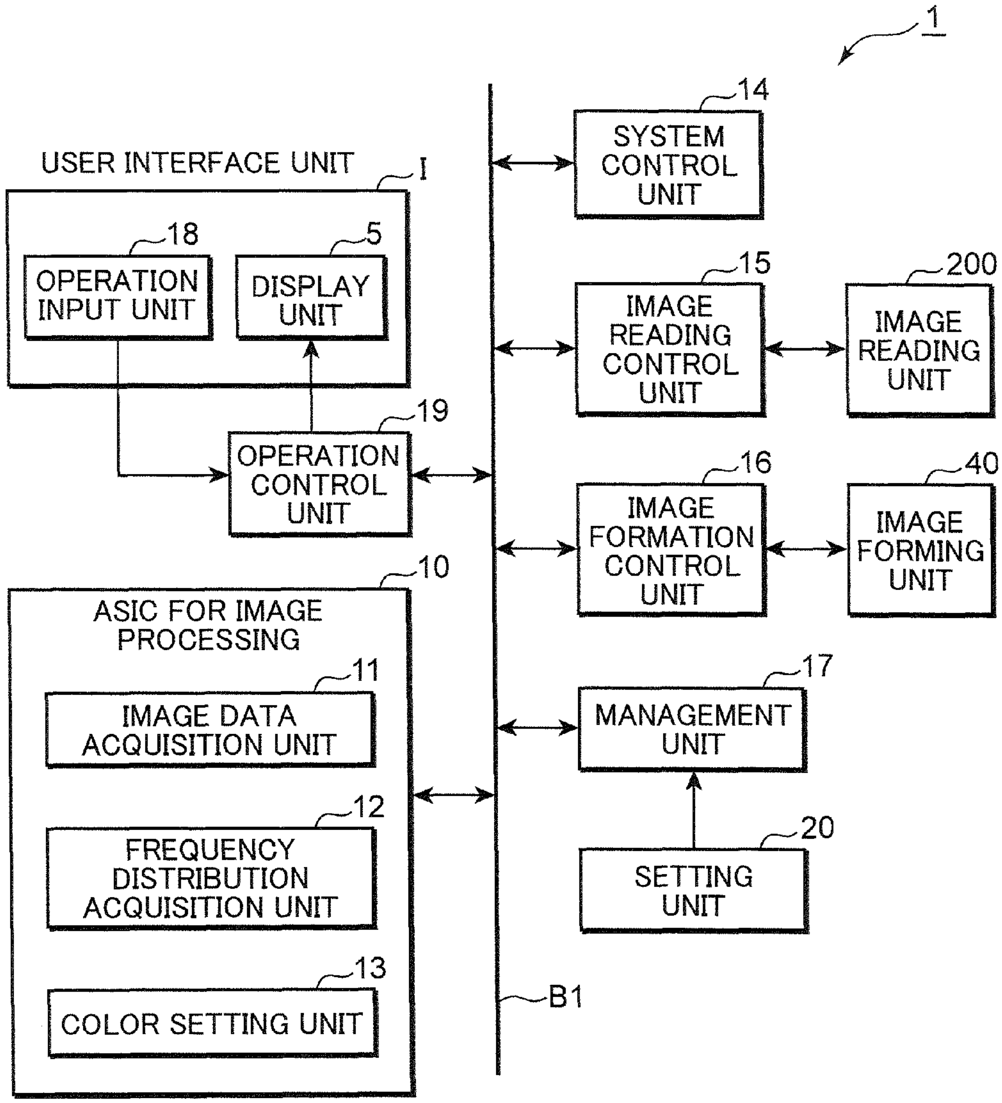
FIG. 2 is a block diagram illustrating an example of electric configuration of the image forming apparatus shown in FIG. 1.

FIG. 2 is a block diagram illustrating an example of electrical configuration of the image forming apparatus 1 shown in FIG. 1. The image forming apparatus 1 is provided with an ASIC (Application Specific Integrated Circuit) 10 for image processing, the user interface unit I, a system control unit 14, an image reading control unit 15, an image formation control unit 16 (example of control unit), a management unit 17, an operation control unit 19, a setting unit 20, the image forming unit 40, and the image reading unit 200.

The ASIC 10 for image processing, system control unit 14, image reading control unit 15, image formation control unit 16, and management unit 17 are configured to be capable of exchanging data with each other via a bus B1. The operation control unit 19 is connected to the user interface unit I, the image reading control unit 15 is connected to the image reading unit 200, the image formation control unit 16 is connected to the image forming unit 40, and the management unit 17 is connected to the setting unit 20.

The ASIC 10 for image processing is provided with an image data acquisition unit 11, a frequency distribution acquisition unit 12, and a color setting unit 13. The image data acquisition unit 11 acquires image data representing a color image. The image data acquisition unit 11 represents the color of each pixel constituting the image data by density values of three preset primary colors, for example, cyan (C), magenta (M), and yellow (Y). The image data acquisition unit 11 represents the density values by predetermined basic bit numbers, for example by 8 bits.

The image data acquisition unit 11 may also represent image data by density values of red, green, and blue. In this case, the density values of red, green and blue are also represented by basic bit numbers, for example by 8 bits.

The image data acquisition unit 11 may acquire image data, for example, by receiving via the image reading control unit 15 the color image data that have been read from the document by the image reading unit 200. The image data acquisition unit 11 may acquire image data, for example, by receiving via a network (not shown in the figure) the color image data from a personal computer or the like connected to the network. The image data acquisition unit 11 may acquire image data, for example, by receiving the color image data that have been sent from a facsimile device via a telephone line (not shown in the figure). The image data acquisition unit 11 may also acquire image data obtained by subjecting the aforementioned image data to intermediate processing such as bleed removal.

The ASIC 10 for image processing performs the predetermined image processing with respect to the image data acquired by the image data acquisition unit 11. For example, the ASIC 10 for image processing (example of image processing unit) performs background color change processing of changing the background color in the image data to a predetermined color. (see, for example, U.S. Pat. No. 6,567, 544).

This background color change processing replaces the color of pixels with white color, for example, when the pixels that should have white color, which is a background color in color images, have a different color, e.g., in the case where the density of the base surface in the original document with a color image is high or when the back page of the original document is seen through.

The frequency distribution acquisition unit 12 allocates the color of each pixel of image data D to statistical classes on the basis of image data D acquired by the image data acquisition unit 11 and acquires a frequency distribution in which the occurrence rate of each color in image data D is taken as a frequency. The frequency distribution acquisition unit 12 sends frequency distribution information indicating frequency distribution to the color setting unit 13 and the image formation control unit 16.

The frequency distribution as referred to herein is obtained by dividing a variate range into a plurality of classes when a sample has a certain variate, and calculating the number of samples having the variate belonging to each class as a frequency (occurrence rate). The frequency distribution acquisition unit 12 takes pixels as samples and pixel values (density values) representing the colors of pixels as variates and divides the colors, that is, pixel values, into a plurality of ranges to obtain classes. The classes are not necessarily ranges of a fixed width, and pixel values, that is, colors, may be in a one-to-one correspondence relationship with the classes.

For example, where image data D are present that are constituted by three colors, namely, red, blue, and yellow, red blue and yellow become classes, and the numbers of red, blue, and yellow pixels included in the pixel data D are taken as occurrence rates (frequencies) of each color (class).

The diagram in which such colors (classes) are plotted against the abscissa and the occurrence rate (frequency) is plotted against the ordinate to represent the frequency distribution in a two-dimensional system of coordinate is known as the so-called histogram.

The color setting unit 13 sets pattern colors on the basis of occurrence rate of each color in the frequency distribution acquired by the frequency distribution acquisition unit 12. The processing performed by the color setting unit 13 will be described below in greater detail.

The user interface unit I is provided with an operation input unit 18 (example of an identification information input unit) provided with a plurality of operation buttons and a display unit 5 constituted by LED or a touch panel.

The operation input unit 18 is constituted, for example, by a start button, a variety of setting buttons, or a touch panel. The operation input unit 18 and display unit 5 may be also constituted, for example, by a touch panel provided with a display function in which a liquid crystal display device and a touch panel are integrated.

The operation control unit 19 receives a signal indicating the operation input received by the operation input unit 18 and outputs the signal indicating the operation input to the image formation control unit 16 or the setting unit 20.

More specifically, for example, when the start button in the operation input unit 18 is pushed, the operation control unit 19 sends a signal requesting to start the formation of image to the image formation control unit 16. Further, when the operation input unit 18 receives an operation instruction allowing a single-color pattern mode to be executed, the operation control unit 19 sets to the setting unit 20 a signal requesting a setting that allows a single-color pattern mode to be executed. When the operation input unit 18 receives an input of user identification information, the operation control unit 19 sends this identification information to the image formation control unit 16.

The operation control unit 19 displays on the display unit 5 the display corresponding to the display request outputted from the system control unit 14, the image formation control unit 16, or the like.

The system control unit 14 is constituted, for example, by using a microcomputer. The system control unit 14 systematically controls the operation of the image forming apparatus 1 by executing the predetermined control program. The image reading control unit 15 is constituted, for example, by using a microcomputer. The image reading control unit 15 controls the image reading operation performed by the image reading unit 200 by executing the predetermined control program.

The management unit 17 is a storage device constituted, for example, by using a storage element such as a RAM (Random Access Memory). The user identification information, for example, an ID code, is stored in advance in the management unit 17. Identification information of the user that is allowed to perform only image formation in a monochromatic mode and the identification information of the user that is allowed to form images in both the monochromatic mode and the full-color mode are stored in the management unit 17 so as to be distinguishable from one another.

The user allowed to perform only the image formation in the monochromatic mode will be referred to hereinbelow as a monochromatic-restricted user and the user allowed to perform image formation in both the monochromatic mode and the full-color mode will be referred to as an unrestricted user.

The management unit 17 is not necessarily required to store identification information of the user allowed to perform image formation in the monochromatic mode and full-color mode. The monochromatic mode and full-color mode will be described below.

The management unit 17 also stores charging information indicating the fee that should be charged to the user in association with the identification information of each user.

As a result, for example, the businessperson that manages the image forming apparatus 1 can ask the user to pay for image formation by reading the charging information stored in the management unit 17. In other words, in the image formatting apparatus 1, the processing of storing the charging information in the management unit 17 corresponds to charging processing.

The setting unit 20 is constituted, for example, by using a microcomputer. The setting unit 20 performs the setting of whether or not to allow the execution of the below-described single-color pattern mode by executing the predetermined control program.

The setting that allows the execution of the single-color pattern mode will be referred to hereinbelow as a pattern mode allowed setting. Thus, the presence of the pattern mode allowed setting indicates that the execution of the single-color pattern mode has been allowed, and the absence of the pattern mode allowed setting indicates that the execution of the single-color pattern mode has not been allowed.

When the operation control unit 19 sends a signal requesting the setting that allows the execution of the single-color pattern mode, the setting unit 20 stores in the management unit 17 the information that indicates the pattern mode allowed setting in association with the identification information of the user for whom the single-color pattern mode is allowed. As a result, the pattern mode allowed setting is performed by the setting unit 20.

The setting unit 20 may also perform the pattern mode allowed setting as a setting for the entire image forming apparatus 1, regardless of the object user, and may store the presence or absence of the pattern mode allowed setting for each user (identification information) stored in the management unit 17.

A configuration may be also used which is not provided with the setting unit 20 and in which the execution of the pattern mode is uniformly allowed for all monochromatic-restricted users. The setting unit 20 is not necessarily required to perform the pattern mode allowed setting for the users that are allowed to execute both the monochromatic mode and the full-color mode.

The image formation control unit 16 is constituted, for example, by a microcomputer. The image formation control unit 16 controls image formation by the image forming unit 40 by executing the predetermined control program. The image formation control unit 16 receives printing image data from the ASIC 10 for image processing. The image formation control unit 16 has a monochromatic mode (black-and-white mode), a mono-color mode, a full-color mode, and a single-color pattern mode.

The monochromatic mode (monochromatic copying) is a mode in which a black-and-white image based on image data is printed on a paper sheet by using only a black (K) toner.

The mono-color mode is a mode in which an image based on image data is formed on a paper sheet by using only one color, for example red color.

The full-color mode (full-color copying) is a mode in which an image based on image data is formed by using a plurality of colors, that is, all colors that can be formed by the image forming unit 40. More specifically, the full-color mode is a mode in which a color image based on image data is printed on a paper sheet by using toners of cyan (C), magenta (M), yellow (Y), and black (K) colors. An image including all of the colors that can be formed by the image forming unit 40 will be referred to hereinbelow as a full-color image.

The full-color mode may be also a mode in which printing is performed by using toners or red, green, and blue colors.

The single-color pattern mode is a mode in which an image based on image data for printing is formed on a paper sheet by using two colors, namely, the pattern color and black.

The single-color pattern mode is a mode assuming that in the case where a small logo mark colored with a single chromatic color is included in part of the text written by black characters or the text written by black characters is underlined or marked by a single chromatic color, the images of characters are formed with a black toner and only color pattern portions such as the logo marks, underlining, and markings are formed with pattern colors that have been set by the color setting unit 13. The patterns for which the surface area taken by the logo marks, underlining, and markings in a one-page image is considered to be comparatively small will be referred to as a specific pattern (pattern that is special), and the color of the specific pattern will be referred to as a pattern color.

In the single-color pattern mode, the text may be printed by using the below-described second color, and the specific pattern may be printed by using a special color.

Further, the image formation control unit 16 displays with the display unit 5 a display screen that requires the user to input identification information. The image formation control unit 16 performs user authentication by comparing the identification information received by the operation input unit 18 with the identification information stored in the management unit 17.

Further, the image formation control unit 16 associates the fee for the printing job performed with the image forming apparatus 1 by the authenticated user with the identification information of the user and stores the fee as the charging information in the management unit 17. By storing the charging information in the management unit 17, the image formation control unit 16 charges the user.

The image formation control unit 16 charges a higher fee when image formation is performed in a full-color mode than when image formation is performed in a monochromatic mode. When image formation is performed in a single-color pattern mode and the below-described full-color pattern mode, the image formation control unit 16 charges a fee lower than that in the case of the full-color mode, for example, a fee similar to that in the monochromatic mode.

The image formation control unit 16 determines an image formation mode on the basis of information indicating whether the authenticated user is a non-restricted user or a monochromatic-restricted user, the presence or absence of the pattern mode allowed setting, and frequency distribution information. The image formation control unit 16 then controls the image forming unit 40 according to the determined image formation mode, thereby causing the image forming unit 40 to form an image on a paper sheet. The process in which the image formation control unit 16 causes the image forming unit 40 to form an image will be described below simply as the formation of an image by the image formation control unit 16.

More specifically, the image formation control unit 16 allows the user with the identification information registered as a non-restricted user in the management unit 17 to perform image formation in the monochromatic mode and full-color mode. Further, the image formation control unit 16 prohibits the user with the identification information registered as a monochromatic-restricted user in the management unit 17 to perform image formation in the full-color mode and allows this user to perform image formation in the monochromatic mode. Further, the image formation control unit 16 allows the user with the identification information registered as having the pattern mode allowed setting in the management unit 17 to perform image formation in the single-color pattern mode, regardless of whether the user is the monochromatic-restricted user or non-restricted user. The image formation control unit 16 does not necessarily allow the non-restricted user to perform image formation in the single-color pattern mode.

Figure 3:
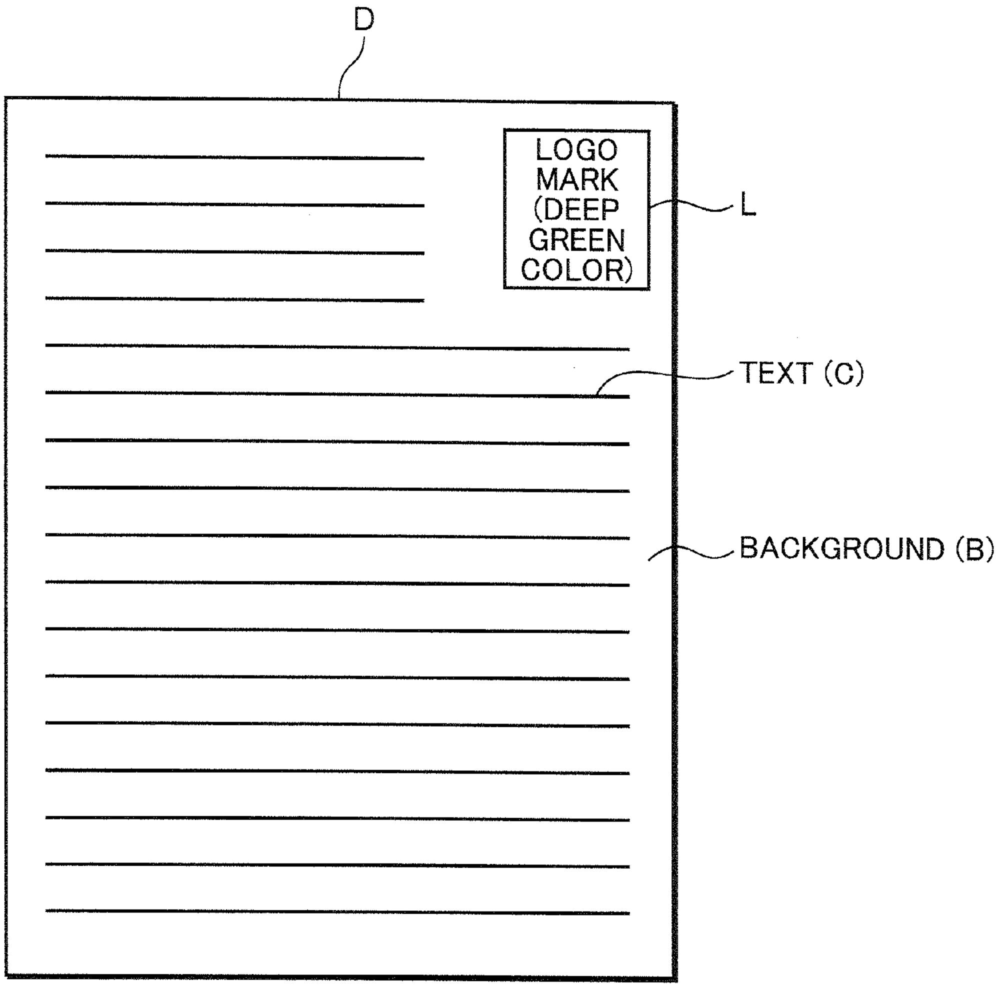
FIG. 3 is an explanatory drawing illustrating schematically an example of the image of the document represented by image data.

FIG. 3 is an explanatory drawing illustrating schematically an example of image of the document represented by image data D. The image data D, for example, represent the document image in which black characters (C) occupy a large portion, a logo mark L is printed in color in the upper right corner of the paper sheet, and the color of the background (B), that is, the background color, is white. The image data D has been subjected to, for example, background color change processing.

The logo mark L is an example of pattern and is, for example, of deep green color. The logo mark L is shown as an example of pattern, but the pattern may also be a monochromatic line, for example red underlining, or a marker portion in which some characters are overprinted with a single color such as a fluorescent color.

A case can be considered in which a color different from the inherent background color is admixed in the background (B) due to bleeding from the rear surface. However, such an admixed color can be changed to the background color by the above-mentioned background color change processing. Therefore, the colors present in the image data D basically include only the background color, character color, and color of the pattern such as the logo mark L.

Figure 4A:
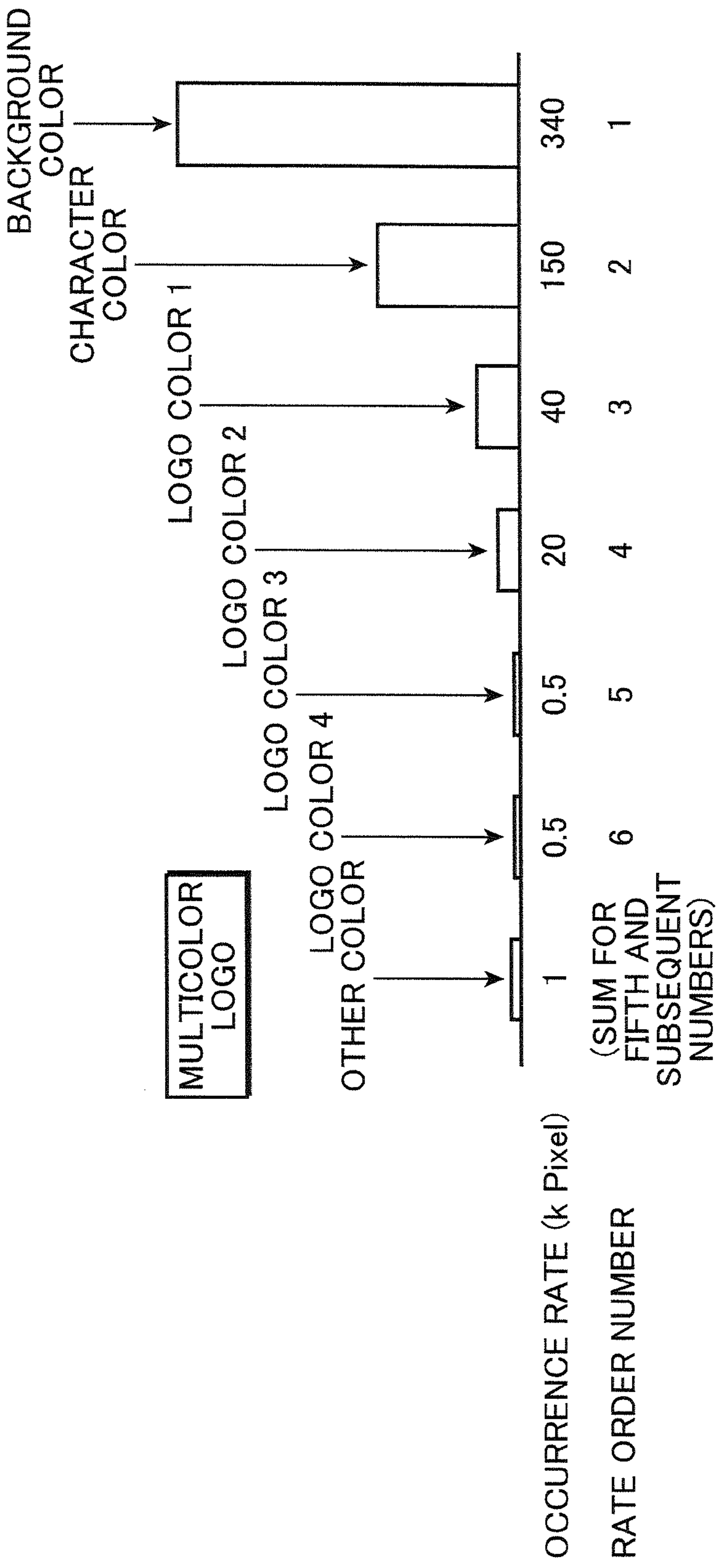
FIG. 4A is an explanatory drawing illustrating an example of a histogram representing the occurrence rate of colors of each pixel of image data.
Figure 4B:
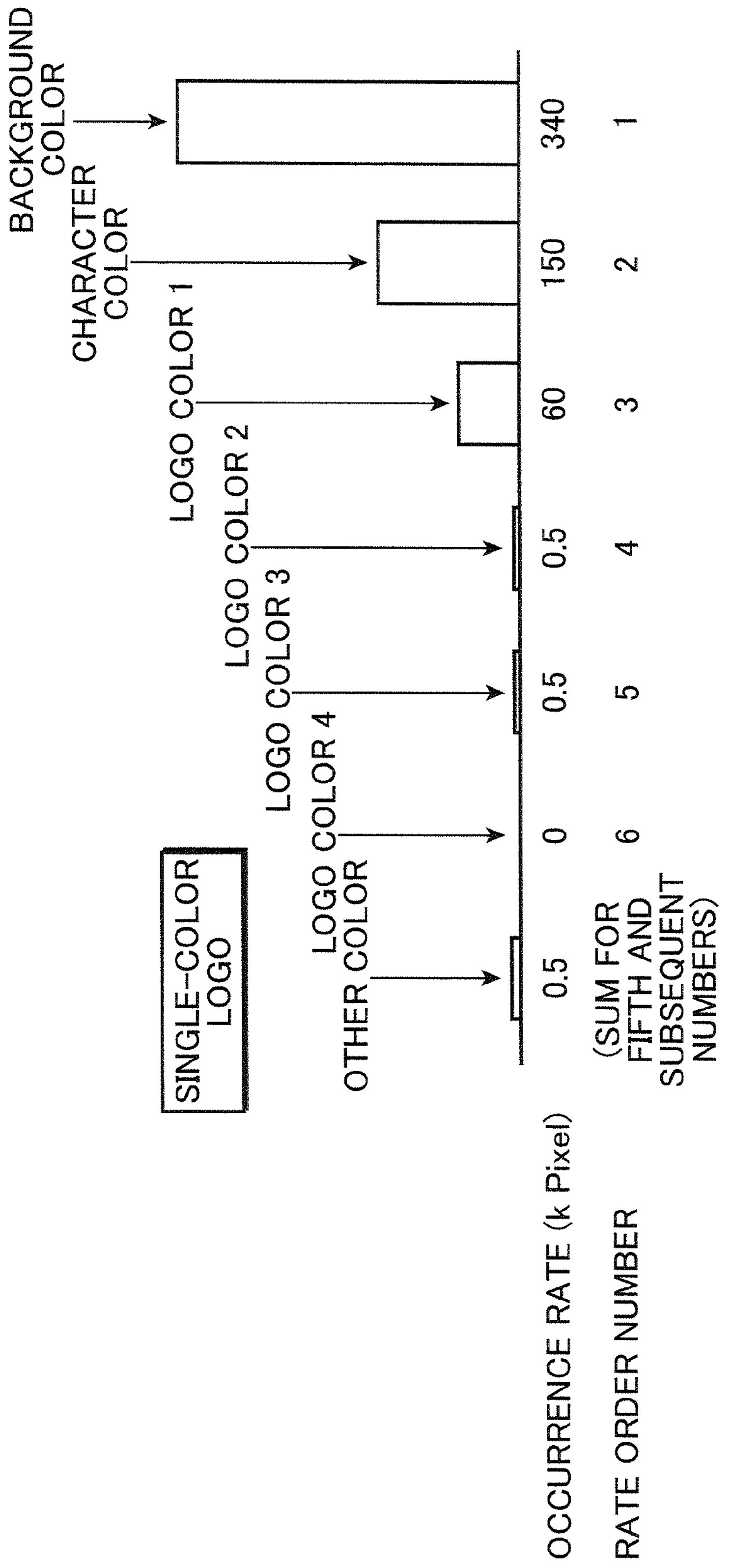
FIG. 4B is an explanatory drawing illustrating an example of a histogram representing the occurrence rate of colors of each pixel of image data.
Figure 4C:
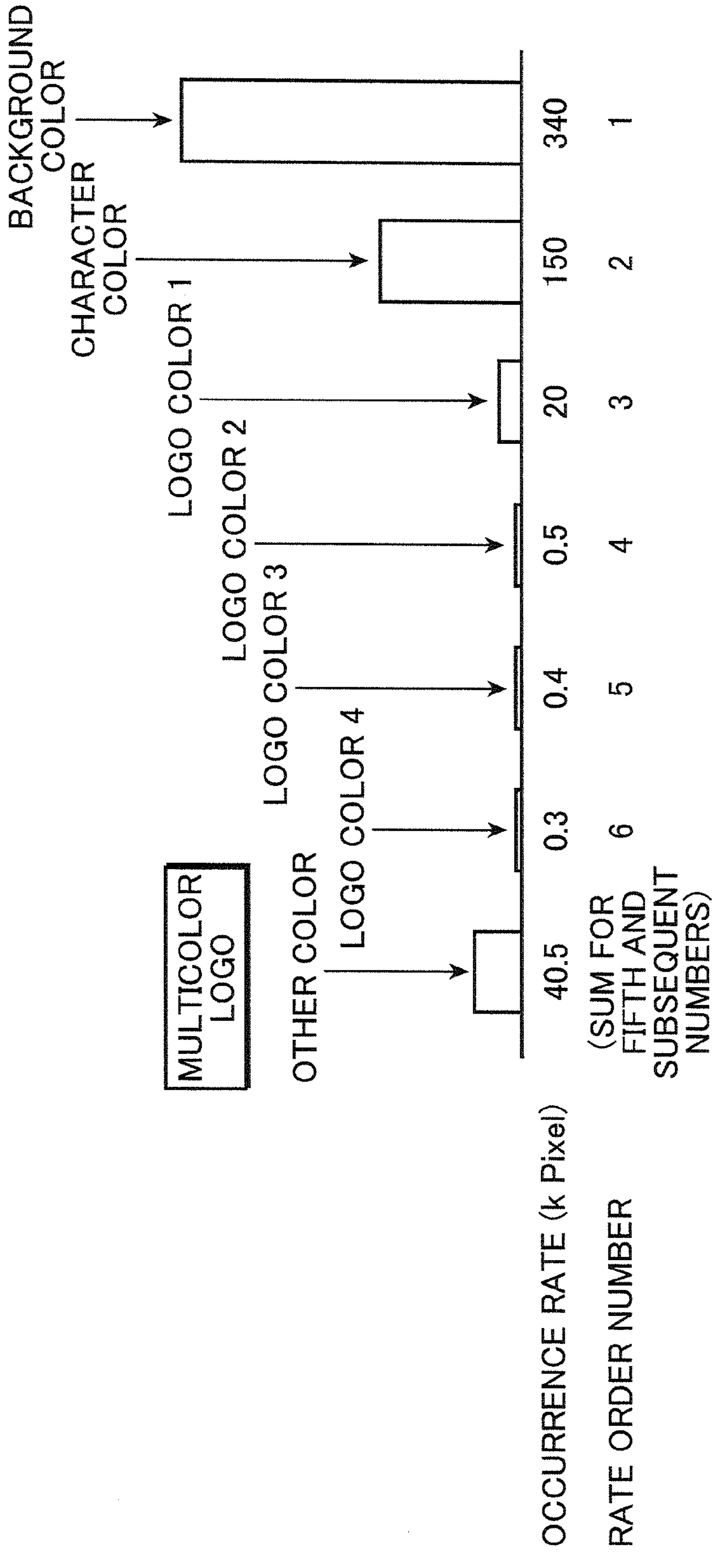
FIG. 4C is an explanatory drawing illustrating an example of a histogram representing the occurrence rate of colors of each pixel of image data.

FIGS. 4A, 4B, and 4C are explanatory drawings illustrating an example of a histogram (frequency distribution) representing the occurrence rate of colors of each pixel of the image data D. FIGS. 4A and 4C show histograms of the image data D in the case where the logo mark L includes a plurality of colors. FIG. 4B shows a histogram of the image data D in the case where the logo mark L is monochromatic.

In the histograms shown in FIGS. 4A, 4B, and 4C, the total number of pixels of the image data D is 551 (k Pixel). In these histograms, colors corresponding to classes are represented on the abscissa, and the background color, character color, logo color 1, logo color 2, logo color 3, logo color 4, and "other colors" are allocated to the classes. The number of pixels of the color of each class in the image data D, that is, the occurrence rate (frequency), is plotted against the ordinate.

The occurrence rate of pixels of each color and the rate order numbers assigned in the order of increasing occurrence rate are shown below the abscissa. With respect to the "other colors", a sum of the occurrence rates of colors with the occurrence rate order number equal to or higher than 5 is shown as the occurrence rate. The units of occurrence rates shown in FIGS. 4A, 4B, and 4C are (k Pixel).

For example, the occurrence rate of the character color in FIG. 4A is 150 (k Pixel), thereby indicating that 150×1024 pixels with the character color are present in the image data D. Further, the occurrence rate of logo color 3 in FIG. 4A is 0.5 (k Pixel), thereby indicating that 0.5×1024 pixels having the color of logo color 3 are present in the image data D.

The colors will be assumed to be represented hereinbelow by assigning the rate order number in the order of increasing occurrence rate, that is, so that the color with the rate order number 1 is the first color and the color with the rate order number 2 is the second color. Thus, the color with the highest occurrence rate in the image data D is called the first color, the color with the second highest occurrence rate in the image data D is called the second color, and subsequent colors are called the third color to the sixth color according to the order of occurrence rate of each color.

In FIG. 4A, the occurrence rate of the first color, which is the background color, is the highest and equal to 340 (k Pixel). The occurrence rate of the second color, which is the character color, is 150 (k Pixel).

The logo mark L shown in FIG. 4A is constituted by a plurality of chromatic colors, for example, two chromatic colors: logo color 1 and logo color 2. The logo color 1 is the third color, and the logo color 2 is the fourth color. Further, for example, the color of pixels in the edge portion of the logo mark L is mixed with the colors of surrounding adjacent pixels, thereby producing the logo color 3 and logo color 4. The logo color 3 is the fifth color and the logo color 4 is the sixth color.

Further, the occurrence rate of the third color (logo color 1) is 40 (k Pixel), the occurrence rate of the fourth color (logo color 2) is 20 (k Pixel), and the occurrence rate of the fifth color (logo color 3) and sixth color (logo color 4) is 0.5 (k Pixel).

In FIG. 4B, the occurrence rate of the first color, which is the background color, is the highest and equal to 340 (k Pixel). The occurrence rate of the second color, which is the character color, is 150 (k Pixel).

The logo mark L shown in FIG. 4B is constituted by a single color which is the logo color 1. the logo color 1 is the third color. Further, for example, the color of pixels in the edge portion of the logo mark L is mixed with the colors of surrounding adjacent pixels, thereby producing the logo color 2 and logo color 3. The logo color 2 is the fourth color and the logo color 3 is the fifth color.

In FIG. 4B, the occurrence rate of the third color (logo color 1) is 60 (k Pixel), the occurrence rate of the fourth color (logo color 2) and fifth color (logo color 3) is 0.5 (k Pixel), and the occurrence rate of the sixth color (logo color 4) is 0 (k Pixel).

In FIG. 4C, the occurrence rate of the first color, which is the background color, is the highest and equal to 340 (k Pixel). The occurrence rate of the second color, which is the character color, is 150 (k Pixel).

The logo mark L shown in FIG. 4C is a full-color multicolor logo which is a full-color logo including a large number of chromatic colors. The logo mark L includes a large number of colors in addition to the logo colors 1 to 4. The logo color 1 is the third color, the logo color 2 is the fourth color, the logo color 3 is the fifth color, and the logo color 4 is the sixth color.

In FIG. 4C, the occurrence rate of the third color (logo color 1) is 20 (k Pixel), the occurrence rate of the fourth color (logo color 2) is 0.5 (k Pixel), the occurrence rate of the fifth color (logo color 3) is 0.4 (k Pixel), and the occurrence rate of the sixth color (logo color 4) is 0.3 (k Pixel). A large number of pixels with colors with an occurrence rate lower than that of the sixth color are also present, and the sum of the occurrence rates of pixels with the fifth color (pixels with the rate order number equal to or higher than 5) is 40.5 (k Pixel).

The operation of the image forming apparatus 1 will be explained below with reference to FIGS. 5 to 8. FIGS. 5 to 8 are flowcharts illustrating examples of basic processing performed in the image forming apparatus 1 shown in FIG. 2.

In the explanation below, the image data D shown in FIG. 3 are taken as a processing object. In the image data D shown in FIG. 3, the color of background B is taken as the first color, the color of characters C is taken as the second color, and the logo mark L is taken to include third to sixth colors with an occurrence rate lower than that of the second color.

Where the user inputs identification information by using the operation input unit 18, the image formation control unit 16 compares the identification information received by the operation input unit 18 with the identification information stored in the management unit 17. Where the comparison result indicates that the two types of identification information match, the image formation control unit 16 authorizes the user and allows the user to login (YES in step S1).

Then, for example, the image data of the original are read by the image reading unit 200 and the image data D are acquired by the image data acquisition unit 11 (step S2). In step S2, the image data D may be subjected to intermediate image processing such as the background color change processing, for example, with the ASIC 10 for image processing.

Then, the image formation control unit 16 determines whether or not the pattern mode allowed setting has been made, that is, whether or not the execution of the single-color pattern mode has been allowed, with respect to the user that has been authorized to login (referred to hereinbelow as "login user") by referring to the management unit 17 (step S3).

When the setting allowing the login user to execute the single-color pattern mode has not been made (NO in step S3), the image formation control unit 16 advances to the processing of step S22 (see FIG. 8) in which whether or not the login user is a non-restricted user is to be verified.

When the setting allowing the login user to execute the single-color pattern mode has been made (YES in step S3), the image formation control unit 16 advances to step S4 and causes the frequency distribution acquisition unit 12 and the color setting unit 13 to perform the below-described processing.

In the example described herein, the image formation control unit 16 advances to step S4 when the setting allowing the login user to execute the single-color pattern mode has been made, regardless of whether the login user is the non-restricted user or the monochromatic-restricted user, but the image formation control unit 16 may also advance to step S4 only when the login user is the monochromatic-restricted user for whom the setting allowing the execution of the single-color pattern mode has been made.

The frequency distribution acquisition unit 12 counts the occurrence rate of each color with respect to each pixel of the image data D (step S4). The frequency distribution acquisition unit 12 also allocates the colors for pixels of the image data D as classes and acquires the frequency distribution representing the occurrence rate of each color (step S5).

Then, the color setting unit 13 sets the first color, for example white color, which is the color with the highest occurrence rate to the background color (step S6) in the frequency distribution acquired in step S5. The color setting unit 13 also sets the second color, for example black color, gray color, Prussian blue, and the like, which has the second highest occurrence rate to the character color (step S7). The color setting unit 13 also extracts the color with the third highest occurrence rate in the frequency distribution as the third color and extracts the color with the fourth highest occurrence rate as the fourth color (step S8).

Figure 6:
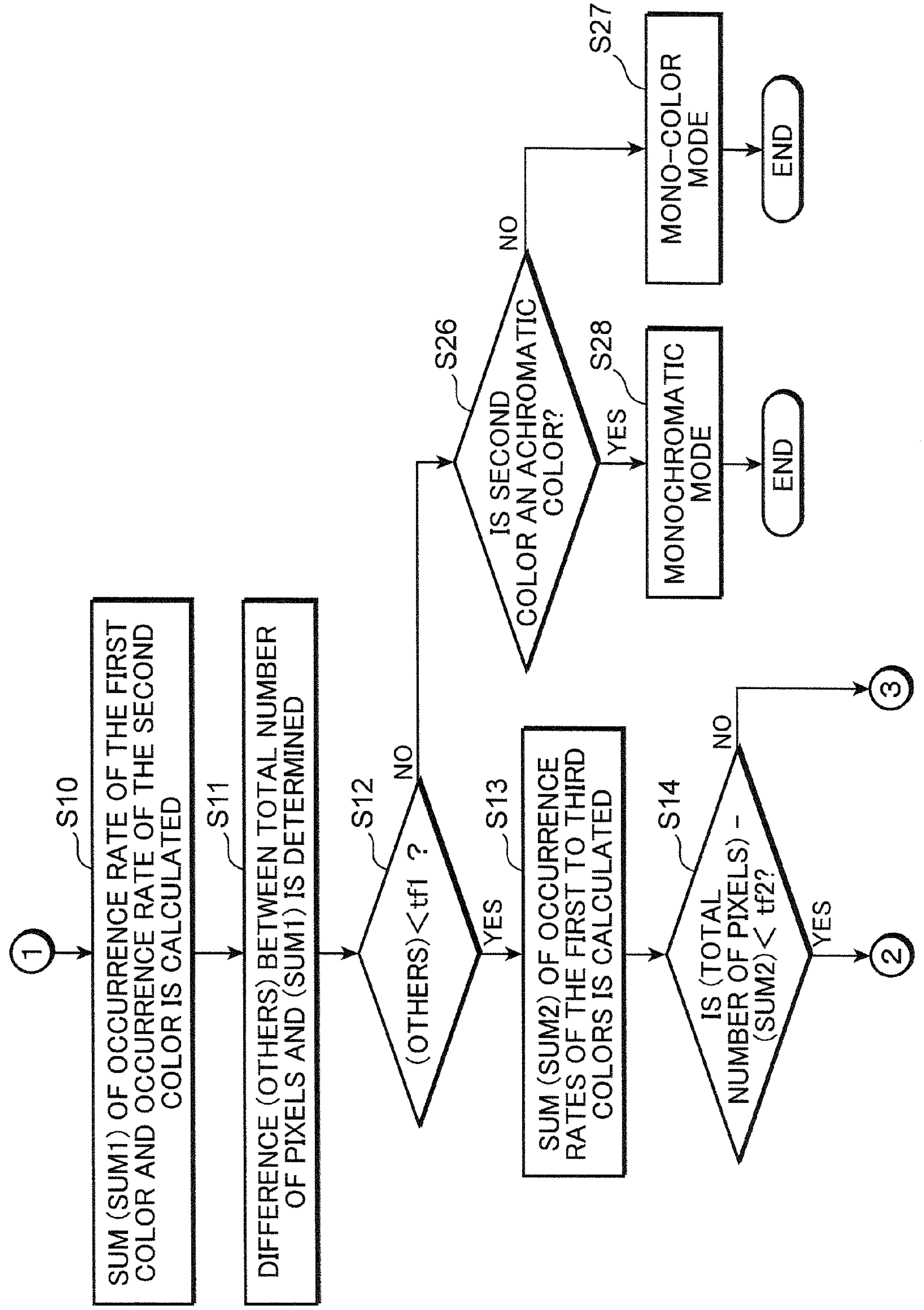
FIG. 6 is a flowchart illustrating an example of operation of the image forming apparatus shown in FIG. 2.

Then color setting unit 13 then sets the third color as a candidate for the pattern color of the logo mark L (step S9) and performs the processing of step S10 and subsequent steps shown in FIG. 6.

Where the difference between the total number of pixels of a color image and the sum of occurrence rate of the first color considered as the background color and the second color considered as the character color is large, that is, where the occurrence rate of colors with the occurrence rate lower than that of the second color is large, the surface area of the specific pattern with a chromatic color is considered to be large. Where the surface area of the specific pattern with a chromatic color is large, the consumption of chromatic color toner for printing the specific pattern increases.

Since chromatic color toners are more expensive than black toners, where the single-color pattern mode is executed and the specific pattern thereof is color printed when the difference between the total number of pixels of a color image and the sum of the occurrence rates of the first color and second color is large, the printing cost rises.

By contrast, where the difference between the total number of pixels of a color image and the sum of the occurrence rates of the first color and second color is small, that is, where the occurrence rate of the colors with the occurrence rate lower than that of the second color is small, the surface area of the specific pattern with a chromatic color is considered to be small. Where the surface area of the specific pattern with a chromatic color is small, the amount of chromatic color toner necessary to print the specific pattern is small. Therefore, when the difference between the total number of pixels of a color image and the sum of the occurrence rates of the first color and second color is small, even if the single-color pattern mode is executed and the specific pattern thereof is color printed, the increase in printing cost is insignificant.

Accordingly, when the difference between the total number of pixels of a color image and the sum of the occurrence rates of the first color and second color is considered to be small and the surface area of the specific pattern with a chromatic color is considered to be small, the color of the logo mark L that has an important meaning for the user or the color of underlining, markers, and the like can be faithfully reproduced on the recording paper by allowing the login user to perform image formation in the single-color pattern mode, regardless of whether the login user is a non-restricted user or a monochromatic-restricted user. As a result, the degree of user satisfaction can be increased within a range of small increase in the printing cost caused by using chromatic colors for printing.

Accordingly, the color setting unit 13 calculates the sum of the occurrence rate of the first color and the occurrence rate of the second color as (SUM1) (step S10). The color setting unit 13 then calculates (OTHERS) by subtracting (SUM1) from the total number of pixels of the color image on the basis of Equation (1) below (step S11).

$$(\text{OTHERS})=(\text{Total number of pixels})-(\text{SUM1}) \quad (1)$$

The color setting unit 13 then determines whether the (OTHERS) is greater than the size determination value tf1 that has been determined in advance (step S12).

Where the (OTHERS) is small, the region occupied by the specific pattern, such as the logo mark L, that apparently has the color with the occurrence rate lower than that of the second color, in the image data D is considered to be small.

Therefore, when the (OTHERS) is less than the size determination value tf1 in step S12 (YES in step S12), the color setting unit 13 assumes that the size of the specific pattern is small and advances to the processing of step S13.

Meanwhile, where the (OTHERS) is equal to or greater than the size determination value tf1 (NO in step S12), the color setting unit 13 sends information indicating that the (OTHERS) is equal to or greater than the size determination value tf1 to the image formation control unit 16. When the (OTHERS) is equal to or greater than the size determination value tf1, the surface area of the specific pattern is considered to be large and where the single-color pattern mode is executed, the cost of printing is increased because a chromatic color toner is used. Accordingly, when the (OTHERS) is equal to or greater than the size determination value tf1, the image formation control unit 16 advances to step S26 in which the printing mode based on the character color is to be selected, instead of executing the single-color pattern mode, even when the execution of the single-color pattern mode has been allowed.

When the single-color pattern mode is not executed, it is preferred that a monochromatic mode be executed in which all of the image data D are presented by using a black toner in order to reduce the printing cost.

However, where the character color is a chromatic color, it is preferred that the character color be faithfully reproduced by using the chromatic color toner. Therefore, in step S26, the image formation control unit 16 determines whether or not the second color which is the color considered as the character color is an achromatic color.

Where the second color is an achromatic color (YES in step S26), the image formation control unit 16 executes the monochromatic mode (step S28). Where the second color is a chromatic color (NO in step S26), the image formation control unit 16 executes the mono-color mode (step S27).

In the mono-color mode in step S27, the characters (C) and the logo mark L are printed by using the chromatic toner of the second color. As a result, the character color can be faithfully reproduced.

Where the difference {(total number of pixels)−(SUM2)} obtained by subtracting the sum (SUM2) of the occurrence rates of the first color, second color, and third color from the total number of pixels of the image data is less than a pattern determination value tf2, the occurrence rates of the fourth color, fifth color, and sixth color are considered to be small. In this case, it is highly probable that the specific pattern is constituted by single third color.

Accordingly, in step S13, the color setting unit 13 calculates the sum of the occurrence rates of the first color, second color, and third color as (SUM2) (step S13). Then, the color setting unit 13 subtracts the (SUM2) from the total number of pixels of the image data D and determines whether or not the {(total number of pixels)−(SUM2)} is less than the predetermined pattern determination value tf2 (step S14).

When the determination result indicates that the {(total number of pixels)−(SUM2)} difference is less than the pattern determination value tf2 (YES in step S14), the color setting unit 13 assumes that the specific pattern is of a single color and advances to the processing of step S15 (see FIG. 7) in which the execution of single-color pattern mode is to be determined. Where the difference is equal to or greater than the pattern determination value tf2 (NO in step S14), the color setting unit assumes that the specific pattern includes a plurality of colors and advances to the processing of step S22 (see FIG. 8) in which printing in a monochromatic mode or full-color mode is to be executed.

In step S15, the color setting unit 13 determines whether the occurrence rate of the third color is equal to or higher than a reference rate tf3 that has been determined in advance. Where the occurrence rate of the third color is equal to or higher than the reference rate tf3, it is highly probable that the specific pattern constituted by a single color which is the third color occupies a predetermined range in the image data D, but where the occurrence rate of the third color is less than the reference rate tf3, it is highly probable that the colors from the third color to the sixth color are dispersed in the image data D, without forming a pattern.

Where the occurrence rate of the third color is equal to or greater than the reference rate tf3 (YES in step S15), the color setting unit 13 advances to the processing of step S16 in which the execution determination of the single-color pattern mode is to be continued, but where the occurrence rate of the third color is less than the reference rate tf3, the color setting unit advances to the processing of step S22 (see FIG. 8) in which printing in the monochromatic mode or full-color mode is to be executed.

In step S16, the color setting unit 13 determines whether or not the occurrence rate of the third color is less than an auxiliary size determination value tf4 that has been set in advance. The auxiliary size determination value satisfies the following condition: tf4>tf3.

Where the occurrence rate of the third color is less than an auxiliary size determination value tf4, the image surface area of the single-color specific pattern is considered to be small, but when the occurrence rate of the third color is equal to or greater than an auxiliary size determination value tf4, the image surface area of the single-color specific pattern is considered to be large.

Where the occurrence rate of the third color is less than an auxiliary size determination value tf4 (YES in step S16), the color setting unit 13 determines whether or not the second color is an achromatic color (step S17). When it is determined that the second color is an achromatic color (YES in step S17), the color setting unit 13 sets the single-color pattern mode (step S18) and sets the third color as the pattern color (step S19). As a result, reproducibility of the pattern color when printing an image including a chromatic color pattern can be increased.

Whether or not the second color is an achromatic color is determined in the processing of step S17 because if the second color is an achromatic color, the characters C are apparently black characters.

Where the characters C are black characters, the characters C are printed with a black toner even when the single-color pattern mode is executed and therefore no problem arises. However, when the characters C are of a chromatic color, it is undesirable that the single-color pattern mode be executed and the characters C be printed with the black toner. Accordingly, when the second color is determined to be a chromatic color in step S17 (NO in step S17), the color setting unit 13 advances to step S22 in which printing in a full-color mode is to be executed.

The determination of achromatic color in step S17 is not always required and, for example, step S17 may be skipped when it is clear that the color of characters C is black even without the determination of step S17.

After the single-color pattern mode and the pattern color have been set, the color setting unit 13 notifies the image formation control unit 16 of setting the single-color pattern mode and setting the third color as the pattern color of the specific pattern.

As a result, the image formation control unit 16 executes the single-color pattern mode (step S20), prints the pattern by using the color toner of the pattern color that has been set by the color setting unit 13, and prints the characters C by using the colored toner of the second color, for example, a black toner.

After the processing of step S20 has been completed, the image forming apparatus 1 updates charging information of the user (step S21). For example, the image forming apparatus 1 registers in advance the fee that should be charged to the user as the charging information for each identification information of the user in the management unit 17 and after the image formation in the single-color pattern mode has been executed, successively registers the fee corresponding to the implemented mode as the charging information corresponding to the identification information of the user.

Since the fee corresponding to the single-color pattern mode is thus successively recorded as the charging information, it can be easily determined how much the user should be charged.

When the occurrence rate of the third color is equal to or greater than the auxiliary size determination value tf4 in step S16 (NO in step S16), the color setting unit 13 advances to the processing of step S22 to avoid the use of a large amount of expensive chromatic color toner with the single-color pattern mode in which the fee charged to the user is low.

Figure 8:
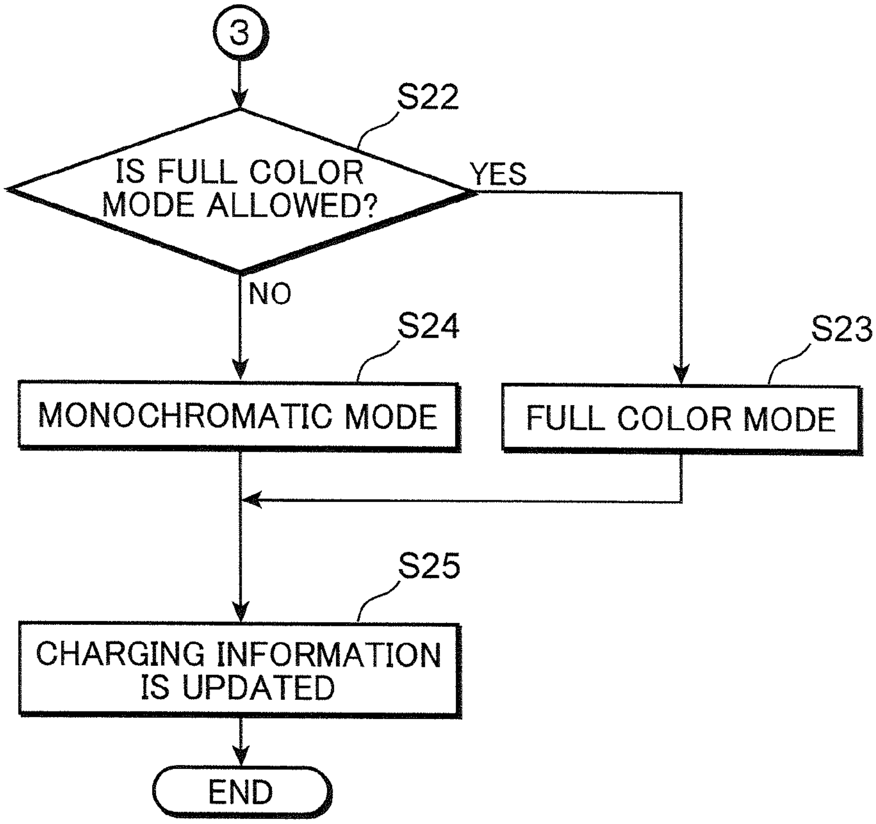
FIG. 8 is a flowchart illustrating an example of operation of the image forming apparatus shown in FIG. 2.

When the single-color pattern mode has not been allowed for the user that has logged in step S3 (NO in step S3), the color setting unit 13 advances from the processing of step S3 to the processing of step S22 (see FIG. 8).

Further, when the value of {(total number of pixels)−(SUM2)} is equal to or greater than the pattern determination value tf2 in step S14 (NO in step S14), the color setting unit 13 advances to the processing of step S22 (see FIG. 8) in which the printing in a monochromatic mode or full-color mode should be executed. This is because when the value of {(total number of pixels)−(SUM2)} is equal to or greater than the pattern determination value tf2, the occurrence rate of the fourth color, fifth color, and sixth color are considered to be high and the pattern is highly probable to include a plurality of colors.

Further, even when the occurrence rate of the third color is less than the reference rate tf3 in step S15 (NO in step S15), the color setting unit 13 advances to the processing of step S22 (see FIG. 8) in which the printing in a monochromatic mode or full-color mode should be executed. When the occurrence rate of the third color is less than the reference rate tf3, it is highly probable that the third to sixth colors are dispersed in the image data D, without constituting the pattern with the uniform third color. This is because in such a case the formation of image in the single-color pattern mode in which only the specific pattern is printed in color is not suitable for the image data D.

Further, even when the occurrence rate of the third color is equal to or higher than the auxiliary size determination value tf4 in step S16 (NO in step S16), the color setting unit 13 advances to the processing of step S22 (see FIG. 8) in which printing in the monochromatic mode or full-color mode should be executed. This is because, when the occurrence rate of the third color is equal to or higher than the auxiliary size determination value tf4, it is highly probable that the image area of the pattern for which the color is considered to be the third color is large.

The processing of steps S22 to S24 will be explained below with reference to FIG. 8.

In step S22, when the user that has logged in to the image forming apparatus 1 is not the user that is allowed to execute the full-color mode (NO in step S22), the color setting unit 13 sets the monochromatic mode (step S24).

In the monochromatic mode, the image formation control unit 16 prints the image data D by using only the black color toner.

Meanwhile, when the user that has logged in to the image forming apparatus 1 is the user that is allowed to execute the full-color mode (YES in step S22), the color setting unit 13 sets the full-color mode (step S23).

In the full-color mode, the image formation control unit 16 prints the image data D by using all of the color toners.

The image formation control unit 16 then updates charging information of the user (step S25). For example, the image forming apparatus 1 registers in advance the fee that should be charged to the user as the charging information for each identification information of the user in the management unit 17 and after the image formation in the monochromatic mode or full-color mode has been executed, successively registers the fee corresponding to the implemented mode as the charging information corresponding to the identification information of the user.

Since the fee corresponding to the executed monochromatic mode or full-color mode is thus successively recorded as the charging information, it can be easily determined how much the user should be charged.

The color setting unit 13 may set the third color as a candidate for the pattern color in step S9 and then skip the processing of steps S10 to S12 and step S15, execute the processing of steps S13, S14, S17, S18, and S19, and set the third color as the pattern color.

Figure 9:
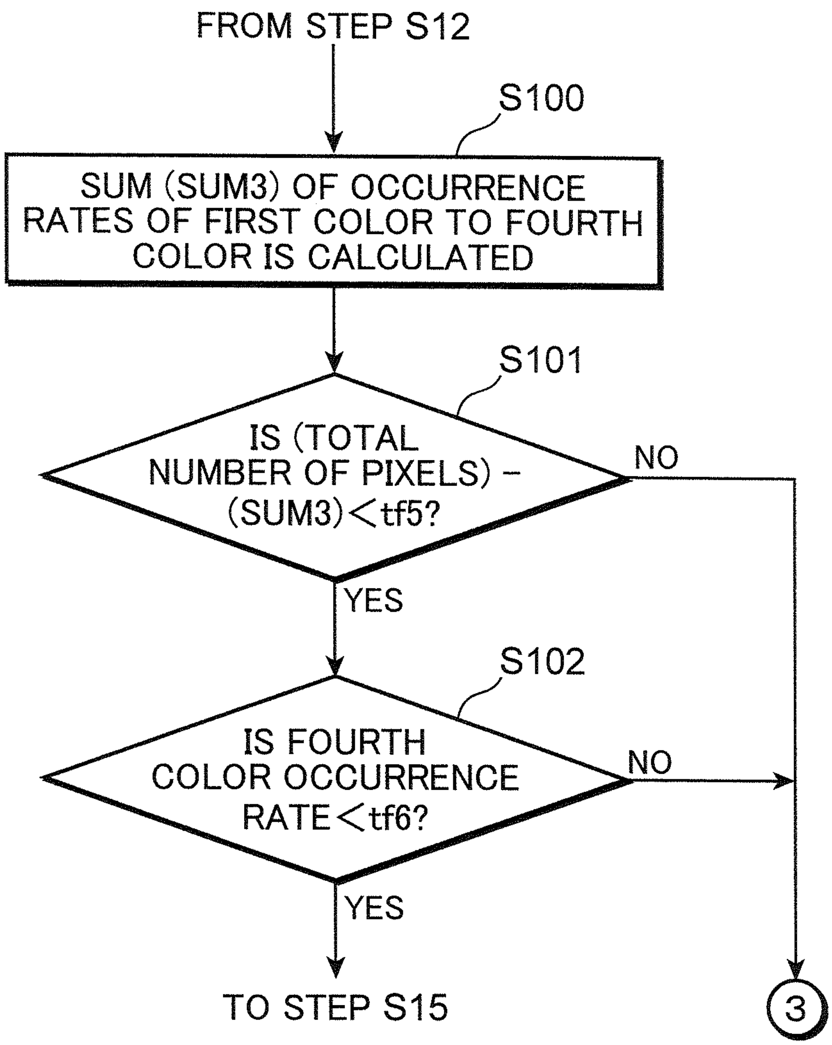
FIG. 9 is a flowchart illustrating another example of operation of the color setting unit shown in FIG. 6.

However, the color setting unit 13 may also perform the processing of steps S100 to S102 shown in FIG. 9 instead of the processing of the abovementioned steps S13 and S14 (see FIG. 6). FIG. 9 is a flowchart illustrating another example of processing performed in the color setting unit 13.

Where the difference between the total number of pixels in the color image and a sum of the occurrence rates of the first color, second color, third color, and fourth color is less than a pattern determination value tf5, it is highly probable that the occurrence rate of colors other than the first color to fourth color, for example, the fifth color or sixth color is low, and that the pattern color is either the third color or the fourth color.

Where the occurrence rate of the fourth color is less than the additional pattern determination value tf6, it is highly probable that the specific pattern is constituted by a single color which is the third color.

Therefore, after performing the processing of step S12 (see FIG. 6), the color setting unit 13 calculates the sum of the occurrence rates of the first color, second color, third color, and fourth color as (SUM3) (step S100). Then, the color setting unit 13 subtracts the (SUM3) from the total number of pixels in the image data D and determines whether or not the difference {(total number of pixels)−(SUM3)} is less than the predetermined pattern determination value tf5 (step S101).

When the difference {(total number of pixels)−(SUM3)} is less than the pattern determination value tf5 (YES in step S101), the color setting unit 13 determines whether or not the occurrence rate of the fourth color is less than the predetermined additional pattern determination value tf6 (step S102).

Meanwhile, when the difference {(total number of pixels)−(SUM3)} is equal to or greater than the pattern determination value tf5 (NO in step S101), the color setting unit 13 assumes that the specific pattern includes a plurality of colors and advances to the processing of step S22 (see FIG. 8) in which printing should be implemented in the full color mode (or monochromatic mode). This is done so because when the difference {(total number of pixels)−(SUM3)} is equal to or greater than the pattern determination value tf5, it is highly probable that the pattern is constituted by a plurality of colors.

When the color setting unit 13 determines in step S102 that the occurrence rate of the fourth color is less than the additional pattern determination value tf6 (YES in step S102), the color setting unit 13 sets the third color as the pattern color by implementing the steps S15 to S18 and then step S19. By implementing the above-described processing of steps S100 to S102, it is possible to reduce the probability of erroneously setting the single third color as the pattern color of a specific pattern including a plurality of colors. As a result, reproducibility of pattern color (color of the patterns) when printing an image including a chromatic color pattern can be improved.

In another possible configuration, the image forming apparatus 1 is not provided with the management unit 17, operation input unit 18, and setting unit 20 and performs the below-described operations, without implementing steps S1, S3, S9 to S12, S15 to S18, and S20 to S28.

For example, the image forming apparatus 1 may successively implement steps S2, S4 to S8, S13, and S14, and where YES is obtained in step S14, implement step S19 and set the third color as the pattern color. Where NO is obtained in step S14, it is also possible to end the processing or implement steps S22 to S25.

As a result, reproducibility of pattern color (color of the pattern) when printing an image including a chromatic color pattern can be improved.

It is also possible to implement steps S100 to S102 instead of steps S13 and S14. Thus, it is possible to implement successively steps S2, S4 to S8, and S100 to 102, and where YES is obtained in step S102, implement step S19 and set the third color as the pattern color. It is thus possible to reduce the probability of erroneously setting the single third color as the pattern color of a specific pattern including a plurality of colors. As a result, reproducibility of pattern color (color of the patterns) when printing an image including a chromatic color pattern can be improved. In the explanation below, a configuration may be likewise used in which steps S100 to S102 are implemented instead of steps S13 and S14.

Further, it is also possible to implement successively steps S2, S4 to S8, S13, and S14, implement step S16 if YES is obtained in step S14, implement step S19 when YES is obtained in step S16, and set the third color as the pattern color. As a result, the third color is set as the pattern color only with respect to a small pattern with a low printing cost, without setting the pattern color with respect to a large pattern with large consumption of chromatic color toners. As a result, the level of user satisfaction is easily increased within the allowable range of printing cost.

In the configuration in which the image formation control unit 16 advances from step S3 to step S4 only when the login user is a monochromatic-restricted user and the setting allowing the implementation of the single-color pattern mode has been made, the image forming apparatus 1 may successively implement steps S1 to S8, S13, and S14, without implementing steps S9 to S12, S15 to S18, S21, S22, S23, and S25, implement steps S19 and S20 and perform image formation in the single-color pattern mode if YES is obtained in step S14, or implement step S24 and perform image formation in the monochromatic mode if NO is obtained in step S14.

In this case, when the input of identification information on the monochromatic-restricted user is received from the identification information input unit and a setting allowing the implementation of the single-color pattern mode to the user having the aforementioned identification information is received by the setting unit, the implementation of the monochromatic mode and single-color pattern mode is allowed to the monochromatic-restricted user. As a result, the level of user satisfaction within a range of small increase in cost load can be increased by using the setting that allows the implementation of the single-color pattern mode.

Figure 7:
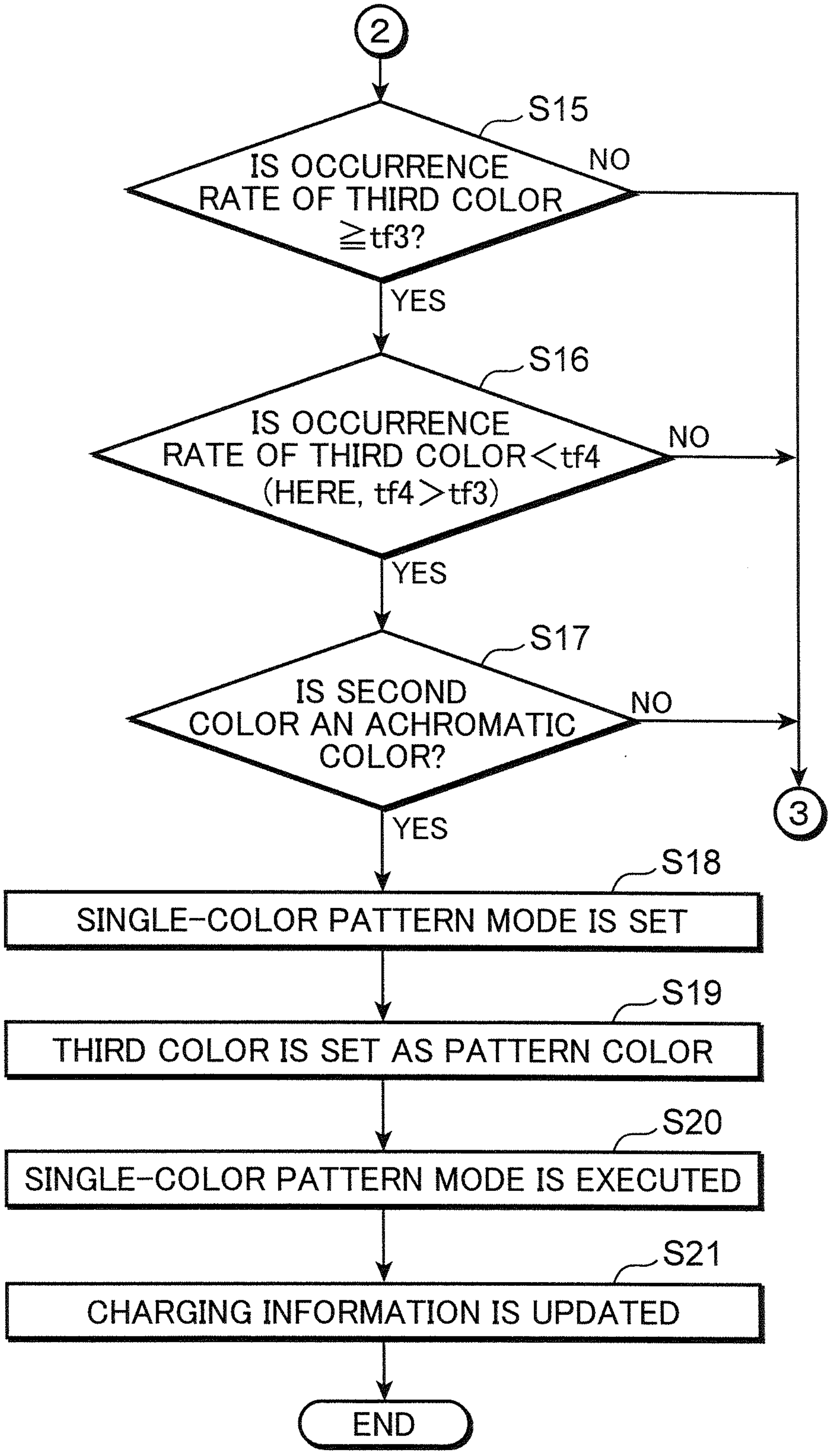
FIG. 7 is a flowchart illustrating an example of operation of the image forming apparatus shown in FIG. 2.

When the occurrence rate of the fourth color is less than the additional pattern determination value tf6 in step S102 (YES in step S102), the color setting unit 13 may set the single-color pattern mode (step S18) and set the third color as the pattern color (step S19), without performing the processing of steps S15 and S16 (see FIG. 7).

Further, the color setting unit 13 may perform the processing of step S100 after the processing of step S9 (see FIG. 5), rather than after the processing of step S12 (see FIG. 6).

Meanwhile when the color setting unit 13 determines that the occurrence rate of the fourth color is equal to or higher than the additional pattern determination value tf6 (NO in step S102), the color setting unit 13 advances to the processing of step S22 (see FIG. 8) in which the full color mode (or monochromatic mode) is to be implemented. This is done so because when the occurrence rate of the fourth color is equal to or higher than the additional pattern determination value tf6, it is highly probable that the pattern includes a plurality of colors.

In the above-described processing, the image formation control unit 16 implements all of the monochromatic mode, mono-color mode, single-color pattern mode, and full-color mode, but it is not always necessary to implement all of the modes and, for example, the monochromatic mode and single-color pattern mode may be implemented.

Figure 10:
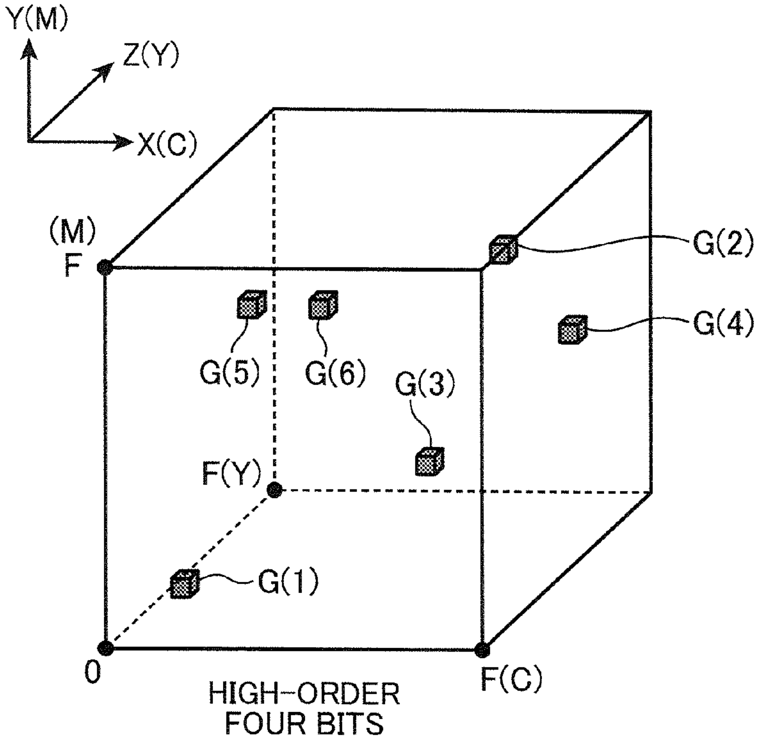
FIG. 10 is an explanatory drawing illustrating schematically an example of frequency distribution indicating the occurrence rate of color groups sharing high-order four bits for each color from among cyan, magenta, and yellow.

The processing of setting the background color, character color, and pattern color will be explained below in detail with reference to FIGS. 10 to 14. FIG. 10 is an explanatory drawing illustrating an example of three-dimensional frequency distribution information indicating frequency distribution generated by the frequency distribution acquisition unit 12 shown in FIG. 2. The frequency distribution acquisition unit 12 may also generate the frequency distribution as a two-dimensional histogram.

Since the color (pixel value) of each pixel of image data D is represented by density values of three primary colors, the color (pixel value) of each pixel can be represented as (c, m, ye), where c stands for a density value of cyan, m—for a density value of magenta, and ye—for a density value of yellow.

Accordingly, as shown in FIG. 10, where the density values of cyan (C), magenta (M), and yellow (Y) are allocated to the coordination axes of three-dimensional coordinates, the color (class) of each pixel will be arranged on the three-dimensional coordinates as a box G shown in FIG. 10. Three-dimensional frequency distribution information in which the histogram is represented three dimensionally is generated by associating the box, that is, class, arranged on the three-dimensional coordinates with a frequency.

The frequency distribution acquisition unit 12 generates the three-dimensional frequency distribution information by so disposing the frequency distribution on the three-dimensional coordinates.

In FIG. 10, the density value of cyan (C) is allocated to the X axis extending in the left-right direction, the density value of magenta (M) is allocated to the Y axis extending in the up-down direction, and the density value of yellow (Y) is allocated to the Z axis extending in the front-rear direction.

As a result, the pixel value (c, m, ye) of each pixel is indicated by a class (box G) arranged at coordinates (X, Y, Z).

The density value of each primary color is Hx00 to HxFF when represented by 8 bits and described in hexadecimal notation. The density values will be represented hereinbelow by adding Hx in the hexadecimal notation. In FIG. 10, only high-order four bits of the density value of each primary color are shown. Thus, the density value of each primary color is represented by Hx0 to HxF.

Actually a plurality of colors with pixel values within the (HxF0 to HxFF, HxF0 to HxFF, HxF0 to HxFF) ranges are included, for example, in the boxes G of classes indicated by coordinates (HxF, HxF, HxF) on the three-dimensional coordinates for which the value of each coordinate axis is represented by high-order four bits. The range for which the low-order four bits of each density value are Hx0 to HxF corresponds to the range of each divided class.

Thus, the class (box) G including a plurality of colors will be referred to hereinbelow as a color group G. The color group G is a class including all of the colors included in the color group G. The sum of the numbers of pixels with all of the colors included in the color group G is taken as an occurrence rate (frequency) of the color group G. A plurality of colors included in the color group G, that is, a plurality of colors sharing the high-order bits of density values will be referred to hereinbelow as colors of the color group G.

Thus, the frequency distribution acquisition unit 12 allocates the high-order four bits in the density value of cyan to the X coordinate, allocates the high-order four bits in the density value of magenta to the Y coordinate, and allocates the high-order four bits in the density value of yellow to the Z coordinate.

As a result, the frequency distribution acquisition unit 12 arranges the colors that share the high-order four bits of density values of cyan, magenta, and yellow, which are the primary colors, as a color group (class) on three-dimensional coordinates.

The frequency distribution acquisition unit 12 does not necessarily allocates the high-order four bits to the coordinate axes, and the number of high-order bits may be greater than four. Further, the frequency distribution acquisition unit 12 may also allocate the total number of bits of each density value to the coordinate axes. In this case, one color group (class) G represents one color and therefore one color is one class.

An example of processing performed by the image forming apparatus 1 by using the color groups will be described below.

The frequency distribution acquisition unit 12, color setting unit 13, and image formation control unit 16 use color groups instead of colors in steps S4 to S16 and use the occurrence rate of color groups instead of the occurrence rates of colors. In this case, where the color groups are represented by the first color group G(1), second color group G(2), third color group G(3), fourth color group G(4), and fifth color group G(5) in the order of decreasing occurrence rate, the colors of the first color group G(1) will be the first colors, the colors of the second color group G(2) will be the second colors, the colors of the third color group G(3) will be the third colors, the colors of the fourth color group G(4) will be the fourth colors, and the colors of the fifth color group G(5) will be the fifth colors.

The frequency distribution acquisition unit 12 allocates the color groups as classes in step S5 and acquires the frequency distribution representing the occurrence rate of each color group. As a result, the processing volume in the frequency distribution acquisition unit 12 can be reduced by comparison with the case where the frequency distribution is acquired with the density value of each color being represented by 8 bits.

In step S6, the color setting unit 13 sets the color with the highest occurrence rate from among the colors of the first color group G(1), which has the highest occurrence rate, that is, from among a plurality of colors which are the first colors, as a background color.

In step S7, the color setting unit 13 sets the color with the highest occurrence rate from among colors of the second color group G(2), which has the second highest occurrence rate, that is, from among a plurality of colors which are the second colors, as a character color.

In steps S17 and S26, the color setting unit 13 determines whether or not the color with the highest occurrence rate from among the second colors is an achromatic color.

In step S19, the color setting unit 13 sets the color with the highest occurrence rate from among the third colors including a plurality of colors which are the colors of the third color group G(3) as a pattern color.

Figure 11:
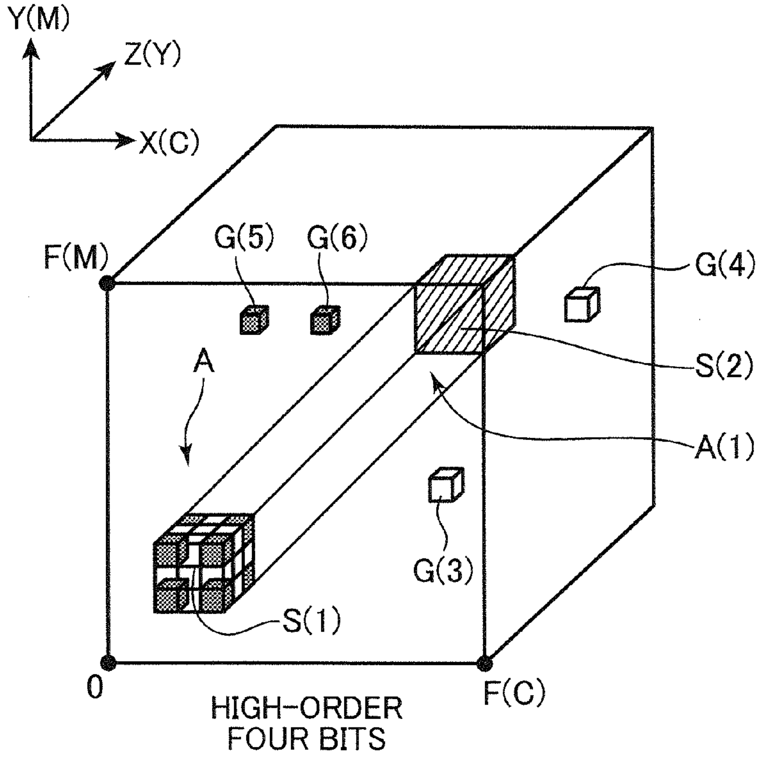
FIG. 11 illustrates schematically an example of frequency distribution in which a region in the form of a rectangular parallelepiped is formed by connecting a group association to which the first color group belongs with the group association to which the second color group belongs.

An example of the processing for determining a pattern color by using color groups will be described below in greater detail. FIG. 11 is an explanatory drawing illustrating schematically an example of the configuration of a group association to which the first color group G(1) and the second color group G(2) belong.

In step S8, the color setting unit 13 may set the third color and the fourth color in the following manner. More specifically, on the basis of the three-dimensional frequency distribution information shown in FIG. 10, the color setting unit 13 forms one group association S(1) from the first color group G(1) and the color groups which are the groups of classes (colors) with coordinate positions at a distance less than a preset determination distance from the coordinate position of the first color group G(1), as shown in FIG. 11.

The color setting unit 13 also forms one group association S(2) from the second color group G(2) and the color groups which are the groups of classes (colors) with coordinate positions at a distance less than a preset determination distance from the coordinate position of the second color group G(2), as shown in FIG. 11.

For example, the color setting unit 13 includes, in one group association S(1), the first color group G(1) and the color groups with coordinate positions at a Euclid distance less than 2 from the coordinate position of the first color group G(1).

For example, the color setting unit 13 includes, in one group association S(2), the second color group G(2) and the color groups with coordinate positions at a Euclid distance less than 2 from the coordinate position of the second color group G(2).

In the three-dimensional coordinates shown in FIGS. 10 and 11, when the coordinates (X, Y, Z) where the first color group G(1) is positioned are taken as a coordinate a (a1, a2, a3) and random coordinates (X, Y, Z) are taken as a coordinate b (b1, b2, b3), the Euclid distance between the two coordinates can be represented by the following Equation (2).

[Equation 2]

$$d(a, b) = \sqrt{\sum_{i=1}^{3} (a_i - b_i)^2} \tag{2}$$

where d(a, b) is the Euclid distance between the coordinate a and the coordinate b.

Figure 12:
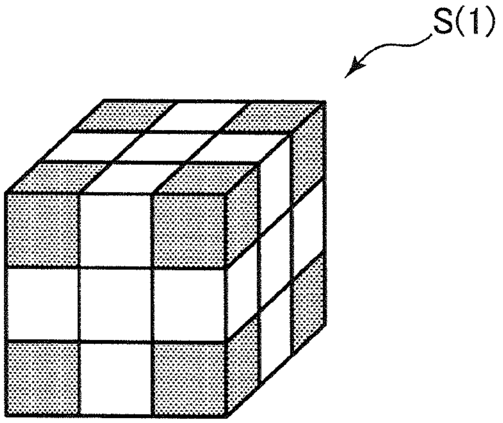
FIG. 12 is a perspective view illustrating schematically an example of group association configuration.
Figure 13:
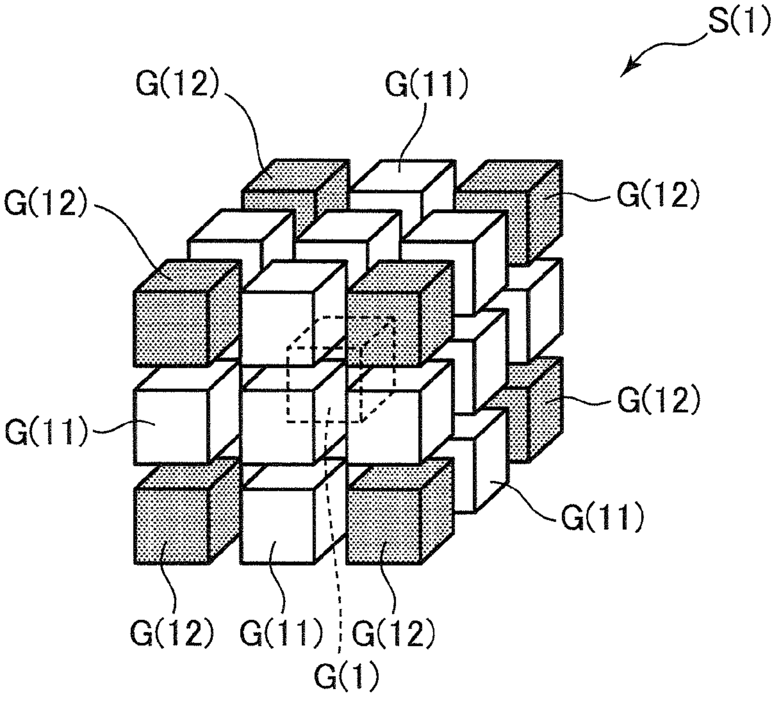
FIG. 13 is an exploded view illustrating schematically an example of group association configuration.

FIG. 12 is a perspective drawing illustrating schematically a configuration example of the group association. FIG. 13 is an exploded view illustrating schematically the configuration example of the group association. In FIGS. 12 and 13, the configuration of the group association S(1) is shown by way of example. Since the group association S(2) has a configuration similar to that of the group association S(1), the graphic representation and explanation thereof are herein omitted.

As shown in FIGS. 12 and 13, the group association S(1) is constituted by the first color group G(1), color groups G(11) that adjoin the first color group G(1) by a surface or a side (referred to hereinbelow as first adjacent color groups), and color groups G(12) that do not adjoin the first color group G(1) by a surface or a side, but are in point contact therewith (referred to hereinbelow as second adjacent color groups).

In FIGS. 12 and 13, the first color group G(1) is represented by a broken line, the first adjacent color groups G(11) are represented by white color, and the second adjacent color groups G(12) are represented by hatching.

In such a group association S(1), the first adjacent color groups G(11) and the second adjacent color groups G(12) are positioned at coordinates that are at a Euclid distance less than 2 from the first color group G(1).

The color setting unit 13 adds the occurrence rate of the first adjacent color groups G(11) and the second adjacent color groups G(12) in the group association S(1) to the occurrence rate of the first color group G(1) and stores the obtained occurrence rate as the occurrence rate of the first color group G(1) in a register or the like (not shown in the figure).

Similarly to the group association S(1), the color setting unit 13 also adds the occurrence rate of the first adjacent color groups and the second adjacent color groups in the group association S(2) to the occurrence rate of the second color group G(2) and stores the obtained occurrence rate as the occurrence rate of the second color group G(2) in a register or the like (not shown in the figure).

The color setting unit 13 may also take as the third color the color (color group) with an occurrence rate next in magnitude to the second color group G(2) in the region remaining after excluding from the three-dimensional coordinates the color of the class that is arranged on a path connecting linearly the group association S(1) and the group association S(2) and has a distance from the first color group G(1) on the three-dimensional coordinates that exceeds a determination distance that has been set in advance, for example the Euclid distance 2, and the color of the class that is arranged on the same path and has a distance from the second color group G(2) that exceeds the determination distance.

For example, as shown in FIG. 11, the color setting unit 13 connects linearly the group association S(1) to which the first color group G(1) belongs to the group association S(2) to which the second color group G(2) belongs, thereby forming a region A (see FIG. 11) in the form of a rectangular parallelepiped that includes the group associations S(1) and S(2). Then, the color setting unit 13 acquires the region A(1) obtained by excluding the group association S(1) and the group association S(2) from the region A. Then, the color setting unit 13 acquires as the third color the color (color group) with an occurrence rate next in magnitude to the second color group G(2) in the region remaining after the region A(1) has been excluded from among the three-dimensional coordinates.

The color setting unit 13 may also use the first color group G(1) and the second color group G(2) instead of the group association S(1) and the group association S(2) in step S8, form the group A in the form of a rectangular parallelepiped that is obtained by linearly connecting the first color group G(1) and the second color group G(2) and includes the first color group G(1) and the second color group G(2), and acquire the region A(1) obtained by excluding from the region A the class (color) for which the distance from the first color group G(1) in the three-dimensional coordinates falls below the determination distance and the class (color) for which the distance from the second color group G(2) falls below the determination distance. The color setting unit 13 then may take as the third color the color (color group) with an occurrence rate next in magnitude to the second color group G(2) in the region remaining after the region A(1) has been excluded from among the three-dimensional coordinates.

Furthermore, the color setting unit 13 may also use the first color and the second color instead of the group association S(1) and the group association S(2) in step S8, form a linear group A that is obtained by linearly connecting the first color and the second color and includes the first color and the second color, and acquire a region A(1) that is obtained by excluding from the region A the class (color) for which the distance from the first color in the three-dimensional coordinates falls below the determination distance and the class (color) for which the distance from the second color falls below the determination distance. Then, the color setting unit 13 may acquire as the third color the color with an occurrence rate next in magnitude to the second color in the region remaining after the region A(1) has been excluded from among the three-dimensional coordinates.

The color setting unit 13 acquires the third color group G(3) with an occurrence rate next in magnitude to the second color group G(2) and acquires the fourth color group G(4) with an occurrence rate next in magnitude to the third color group G(3) in the three-dimensional coordinates from which the region A(1) has been removed.

When color groups that are lower in occurrence rate than the fourth color group G(4), for example, the fifth color group G(5) (see FIG. 10) and the sixth color group G(6) (see FIG. 10) that is lower in occurrence rate than the fifth color group G(5), are present in the three-dimensional coordinates from which the region A(1) has been excluded, the color setting unit 13 also acquires these color groups.

In step S10, the color setting unit 13 may calculate the (SUM1) from the occurrence rate of the first color and second color obtained from the first color group G(1) and the second color group G(2).

Further, in step S13, the color setting unit 13 may calculate the (SUM2) from the occurrence rate of the first color, second color, and third color obtained from the first color group G(1), second color group G(2), and third color group G(3).

Further, in step S100, the color setting unit 13 may calculate the (SUM3) from the occurrence rate of the first color, second color, third color, and fourth color obtained from the first color group G(1), second color group G(2), third color group G(3), and fourth color group G(4).

In step S15, the color setting unit 13 may compare the occurrence rate for the third color obtained from the third color group G(3) with the reference rate tf3.

In step S16, the color setting unit 13 may compare the occurrence rate of the third color obtained from the third color group G(3) with the auxiliary size determination value tf4.

Further, when the single-color pattern mode is set, the color setting unit 13 performs, for example, the following processing in association with the frequency distribution acquisition unit 12. In the below-described processing, the color with the highest occurrence rate from among the third colors including a plurality of colors which are the colors of the third color group G(3) is set as the pattern color.

FIG. 14 are explanatory drawings illustrating schematically the processing of the frequency distribution acquisition unit 12 and the color setting unit 13 performed when the single-color pattern mode is set. In other words, FIG. 14 are explanatory drawings illustrating an example of processing by which the color setting unit 13 in step S19 sets the color with the highest occurrence rate, from among the plurality of colors included in the third colors, as the pattern color.

Figures 14A, 14B:
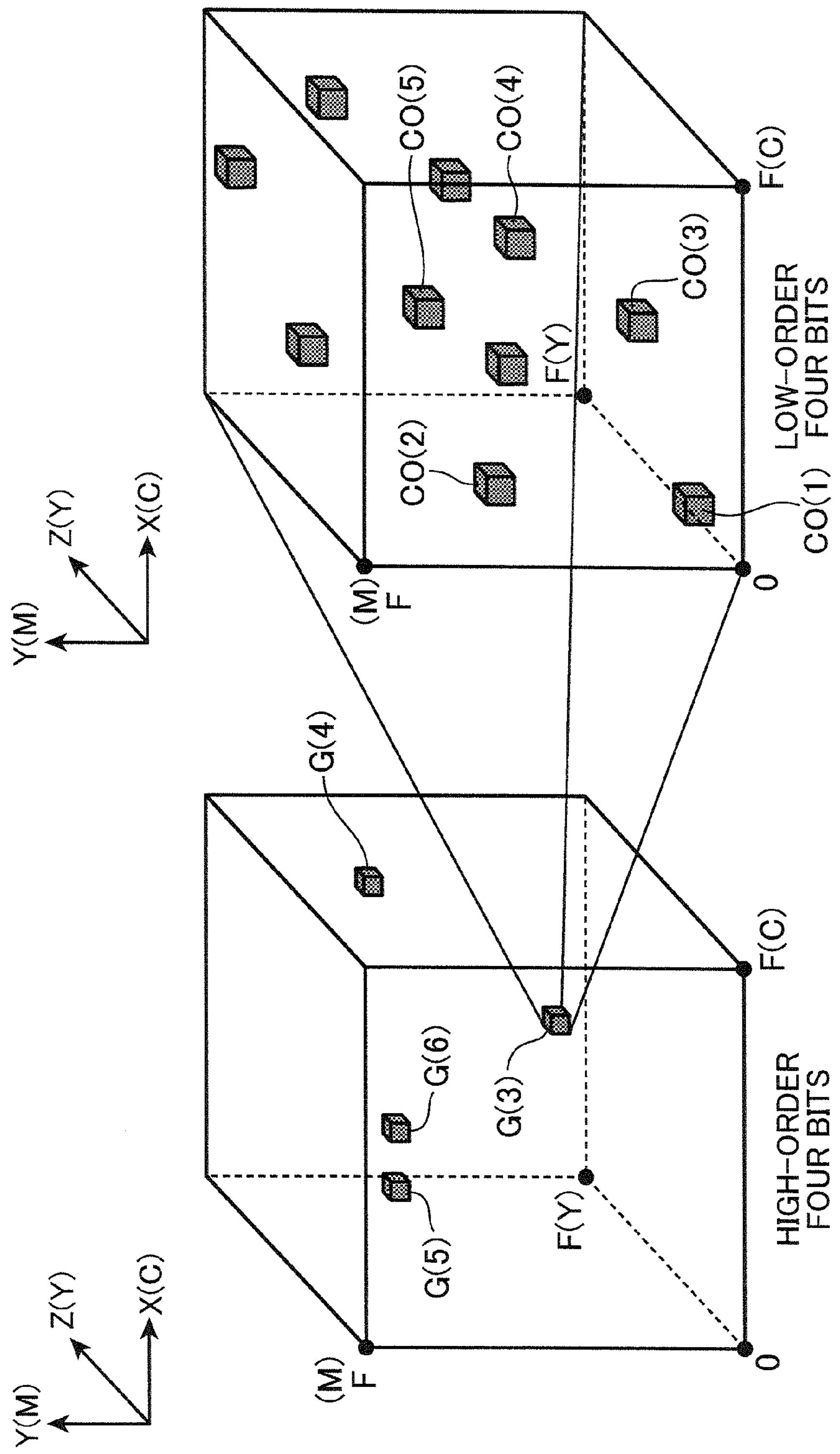
FIGS. 14A and 14B are explanatory drawings illustrating schematically the processing of the frequency distribution acquisition unit and color setting unit when the single-color pattern mode is set.

FIG. 14A shows three-dimensional coordinates in which the high-order four bits of the density values of cyan (C), magenta (M), and yellow (Y) are made to correspond to X, Y, Z axes. FIG. 14B shows a plurality of colors that belong to the third color group G(3).

In FIG. 14B, a plurality of colors that belong to the third color group G(3), for example, the color CO(1), color CO(2), color CO(3), color CO(4), and color CO(5) are represented by small boxes.

In addition to the three-dimensional coordinate information represented at X, Y, Z axes (FIG. 14A), the frequency distribution acquisition unit 12 represents low-order four bits (Hx0 to Hxf) in the number of basic bits which are the density value of cyan (C) on the X axis, low-order four bits (Hx0 to Hxf) in the number of basic bits which are the density value of magenta (M) on the Y axis, and low-order four bits (Hx0 to Hxf) in the number of basic bits which are the density value of yellow (Y) on the Z axis, as shown in FIG. 14B, with respect to the cyan (C), magenta (M), and yellow (Y).

Then, the frequency distribution acquisition unit 12 makes the low-order four bits of density values of cyan (C), magenta (M), and yellow (Y) to correspond to X, Y, and Z axes with respect to a plurality of colors that belong to the third color group G(3), thereby arranging this plurality of colors on the three-dimensional coordinates shown in FIG. 14B.

The color setting unit 13 acquires the occurrence rate of the colors arranged on the three-dimensional coordinates, for example, color CO(1) to color CO(5), with respect to the third color group G(3) and stores the colors in a register or the like (not shown in the figure). The color setting unit 13 then sets the color with the highest occurrence rate, for example, color CO(1), as a pattern color of the specific pattern in the three-dimensional coordinates shown in FIG. 14B.

Second Embodiment

An image forming apparatus according to the second embodiment of the present invention will be described below.

In the first embodiment, an example is shown in which reproducibility of specific pattern color is increased when the specific pattern, such as a logo mark, is a single-color pattern, but in business letters the logo mark is often constituted by a plurality of chromic colors. Further, a plurality of underlining lines and markers are often printed by a plurality of chromic colors.

Therefore, there is a need for increasing color reproducibility also for logo marks constituted by a plurality of chromic colors. Further, it is undesirable that the underlining lines or markers be set to a color different from the original color.

Accordingly, an image forming apparatus 1*a* according to the second embodiment has a full-color pattern mode in which a specific pattern such as a logo mark, an underlining line, or a marker is printed in full color.

Figure 15:
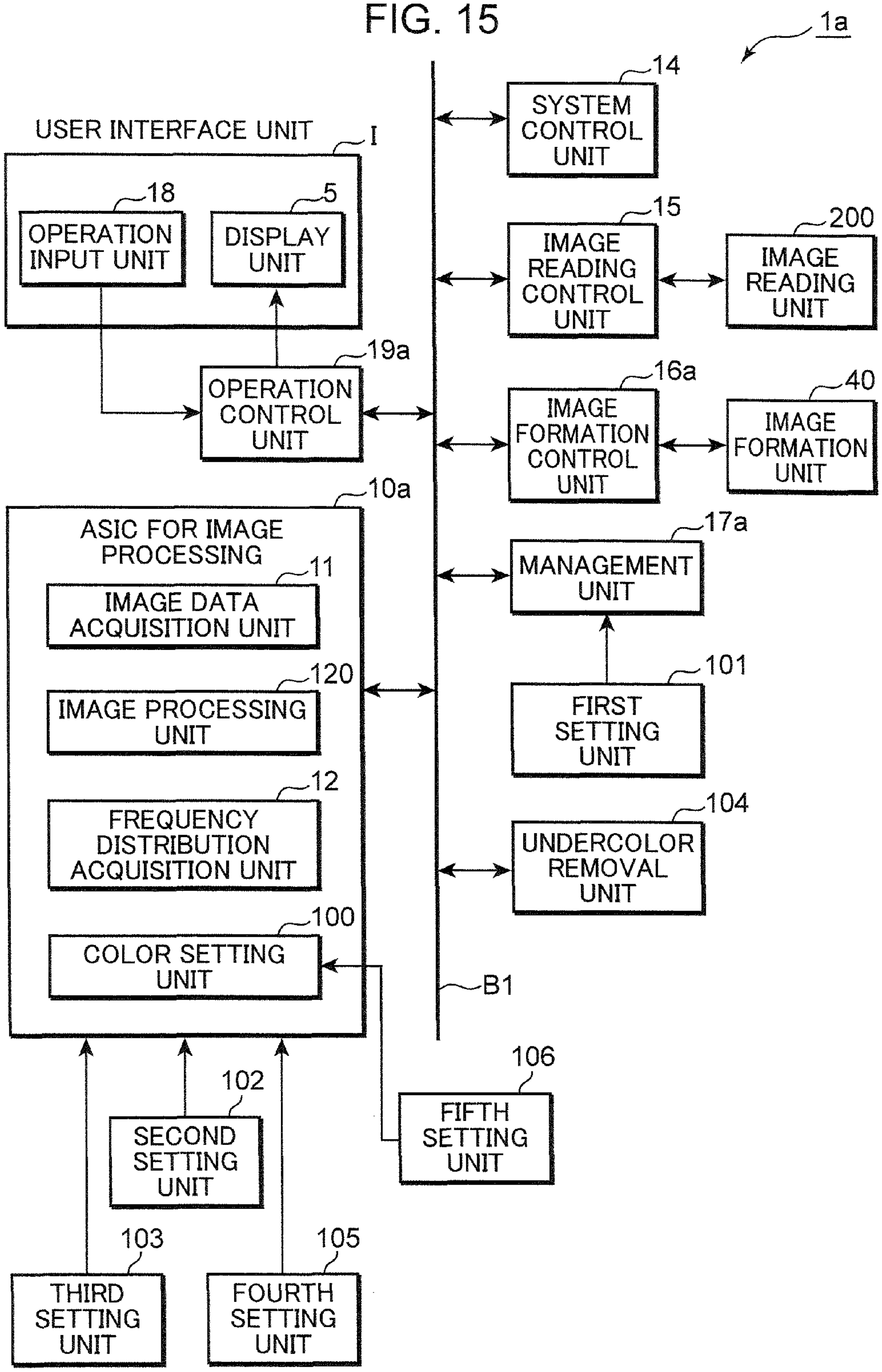
FIG. 15 is a block diagram illustrating another example of electric configuration of the image forming apparatus shown in FIG. 1.

The mechanical structure of the image forming apparatus according to the second embodiment is similar to that of the first embodiment (see FIG. 1). FIG. 15 is a block diagram showing an example of electric configuration of the image forming apparatus 1*a* according to the second embodiment that corresponds to one aspect of the present invention.

The image forming apparatus 1*a* shown in FIG. 15 differs from the image forming apparatus 1 shown in FIG. 2 in the aspects as follows. Thus, the difference is in that the image forming apparatus 1*a* shown in FIG. 15 is further provided with an undercolor removal unit 104, a second setting unit 102, a third setting unit 103, a fourth setting unit 105, and a fifth setting unit 106, the ASIC 10*a* for image processing is further provided with an image processing unit 120, the operation of the image formation control unit 16*a* (example of control unit) and operation control unit 19*a* is different from that of the image formation control unit 16 and the operation control unit 19, the management unit 17*a*, by contrast with the management unit 17, stores information indicating whether the implementation of the single-color pattern mode or full-color pattern mode is allowed as the pattern mode allowing setting, and a first setting unit 101 is provided instead of the setting unit 20.

Other features are similar to those of the image forming apparatus 1 shown in FIG. 2 and the explanation thereof is herein omitted. Only the specific features of the present embodiment are explained below.

The image processing unit 120 performs the predetermined image processing with respect to image data acquired by the image data acquisition unit 11. For example, the image processing unit 120 performs the above-described background color change processing.

The color setting unit 100 is different from the color setting unit 13 in that the full-color pattern mode is set on the basis of occurrence rate of the first color, the second color, and also colors with an occurrence rate lower than that of the second color, and the pattern color, which is the color of the specific pattern in the color image, is set by using the colors with an occurrence rate lower than that of the second color.

The processing performed by the color setting unit 100 will be explained below in greater detail.

The image formation control unit 16*a* differs from the image formation control unit 16 in the aspects as follows. Thus, the image formation control unit 16*a* has the full-color pattern mode as the image formation mode in addition to the monochromatic mode, mono-color mode, full-color mode, and single-color pattern mode. Further, where a setting has been performed that allows the implementation of the below-described full-color pattern mode with respect to the monochromatic-restricted user, the image formation control unit 16*a* allows the implementation of the full-color pattern mode in addition to the monochromatic mode to the monochromatic-restricted user. In other aspects, the image formation control unit 16*a* is configured similarly to the image formation control unit 16 and the explanation of these aspects is herein omitted.

The management unit 17*a* stores information indicating whether the implementation of the single-color pattern mode or full-color pattern mode is allowed as the pattern mode allowing setting in addition to the information similar to that stored in the management unit 17. Thus, in the explanation below, the wording "pattern mode allowing setting is present" means that the implementation of either the single-color pattern mode or the full-color pattern mode has been allowed. The management unit 17*a* may also be configured to store information indicating that the implementation of only the full-color pattern mode has been allowed as a pattern mode allowing setting.

In addition to the operations performed by the operation control unit 19, the operation control unit 19*a* sends a signal corresponding to the operation indication received by the operation input unit 18 to the first setting unit 101, second setting unit 102, third setting unit 103, fourth setting unit 105, and fifth setting unit 106.

The first setting unit 101 is different from the setting unit 20 in the aspects as follows. Thus, the first setting unit 101 records the information indicating the pattern mode allowing setting in the management unit 17*a* in association with the identification information for the user for whom the pattern mode has been allowed, not only when a signal requesting the setting that allows the implementation of the single-color pattern mode is sent from the operation control unit 19*a*, but also when a signal requesting the setting that allows the implementation of the full-color pattern mode is sent from the operation control unit 19*a*. In other aspects the first setting unit 101 is configured similarly to the setting unit 20. As a result, the pattern mode allowing setting is performed by the first setting unit 101. The single-color pattern mode and the full-color pattern mode will be together referred to hereinbelow as a pattern mode.

When the setting of the size determination value tf1 has been received by the operation input unit 18, the second setting unit 102 outputs the size determination value tf1 to the color setting unit 100 and sets this value in the color setting unit 100.

When the setting of the reference ratio has been received by the operation input unit 18, the third setting unit 103 outputs the reference ratio to the color setting unit 100 and sets this ratio in the color setting unit 100.

When the setting of the multiple color determination value tf12 has been received by the operation input unit 18, the fourth setting unit 105 outputs the multiple color determination value tf12 to the color setting unit 100 and sets this value to the color setting unit 100.

As will be described hereinbelow, whether or not the full-color mode is to be set is determined according to whether the occurrence rate of the fourth color is equal to or greater than the multiple color determination value tf12 or less than the multiple color determination value tf12. Since the fourth setting unit 105 is arranged for setting the multiple color determination value tf12, the user can easily set the degree of the occurrence rate of the fourth color at which the image forming mode is to be a full-color pattern mode.

When the setting of the additional multiple determination value tf13 has been received by the operation input unit 18, the fifth setting unit 106 outputs the additional multiple determination value tf13 to the color setting unit 100 and sets this value to the color setting unit 100.

As will be described below, whether or not the full-color mode is to be set is determined according to whether the difference between the total number of pixels in the image and the sum of the occurrence rates of the first color to fourth color is equal to or greater than the additional multiple determination value tf13 or less than the additional multiple determination value tf13. Since the fifth setting unit 106 is arranged for setting the additional multiple determination value tf13, the user can easily set the degree of the difference between the total number of pixels in the image and the sum of the occurrence rates of the first color to fourth color at which the image forming mode is to be a full-color pattern mode.

The undercolor removal unit 104 performs the UCR (undercolor removal) processing during the usual operation, in other words, when an image is printed that is based on the image data D by the image forming unit 40 in a state in which the full-color pattern mode has not been set. The UCR processing is a processing in which a portion corresponding to gray among the density values of cyan, magenta, and yellow is rewritten as black with respect to each pixel of the image data D.

The undercolor removal unit 104 may also replace the portion (component) corresponding to gray among the density values of red, green, and blue with black with respect to each pixel of the image data.

Meanwhile, when the image data are printed by the image forming unit 40 in a state in which the full-color pattern mode has been set, the undercolor removal unit 104 performs 100% UCR processing by replacing the second color, which is considered a character color, with black.

Figure 16:
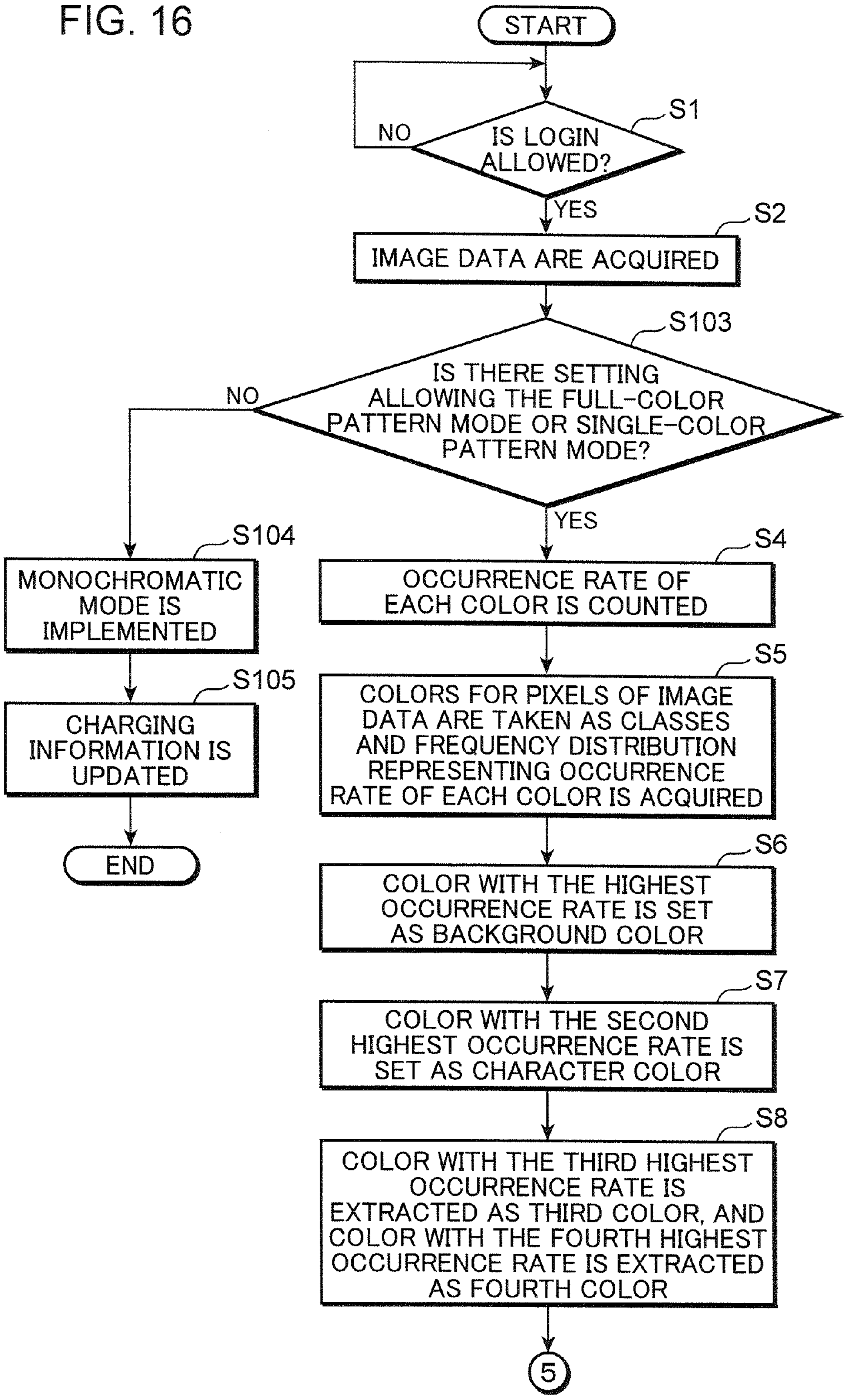
FIG. 16 is a flowchart illustrating an example of operation of the image forming apparatus shown in FIG. 15.
Figure 17:
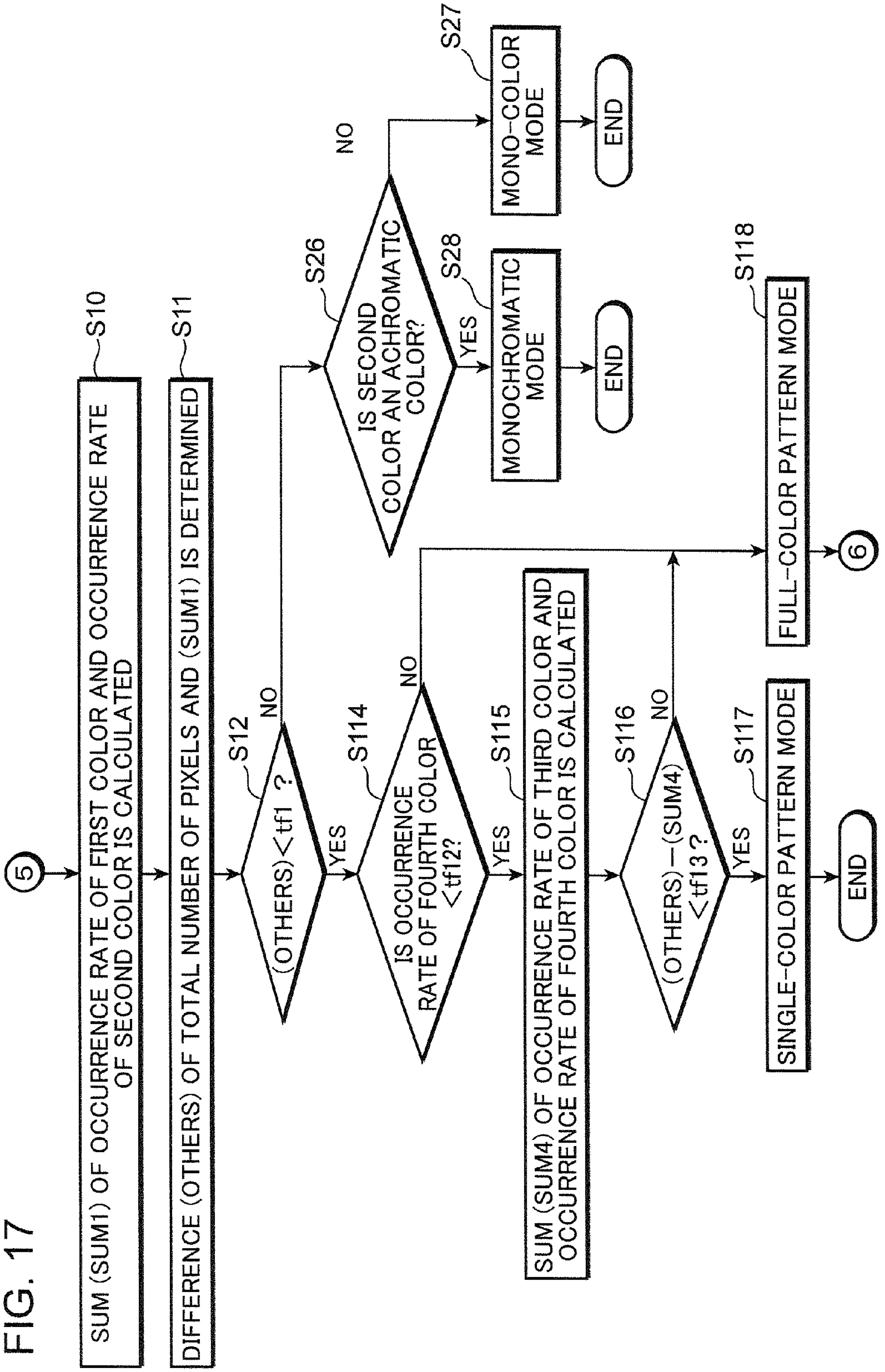
FIG. 17 is a flowchart illustrating an example of operation of the image forming apparatus shown in FIG. 15.
Figure 18:
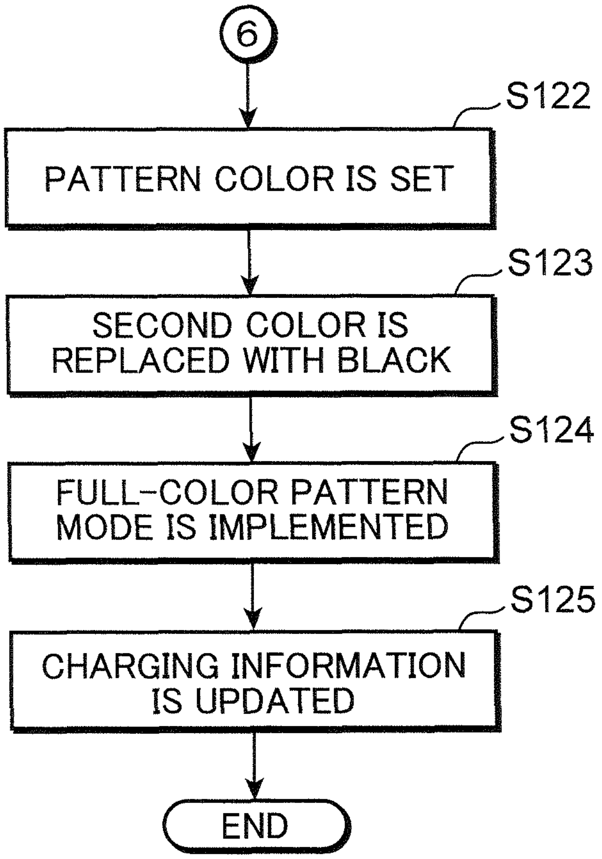
FIG. 18 is a flowchart illustrating an example of operation of the image forming apparatus shown in FIG. 15.

The operation of the image forming apparatus 1*a* will be described below with reference to FIGS. 16 to 18. FIGS. 16 to 18 are flowcharts illustrating an example of operations performed by the image forming apparatus 1*a*. The operations presented in the flowcharts below that are similar to those of the flowcharts shown in FIGS. 5 to 9 that relate to the image forming apparatus 1 are assigned with same step numbers and the explanation thereof is herein omitted, the difference between the flowcharts being in that that the ASIC 10 for image processing, color setting unit 13, image formation control unit 16, and management unit 17 are replaced with the ASIC 10*a* for image processing, color setting unit 100, image formation control unit 16*a*, and management unit 17*a*.

In the explanation below, the color of the background B is taken as the first color, and the color of characters C is taken as the second color. The logo mark L is assumed to include the following four colors: the third color, the fourth color, the fifth color, and the sixth color which are the colors with an occurrence rate lower than that of the second color in the image data D.

Figure 5:
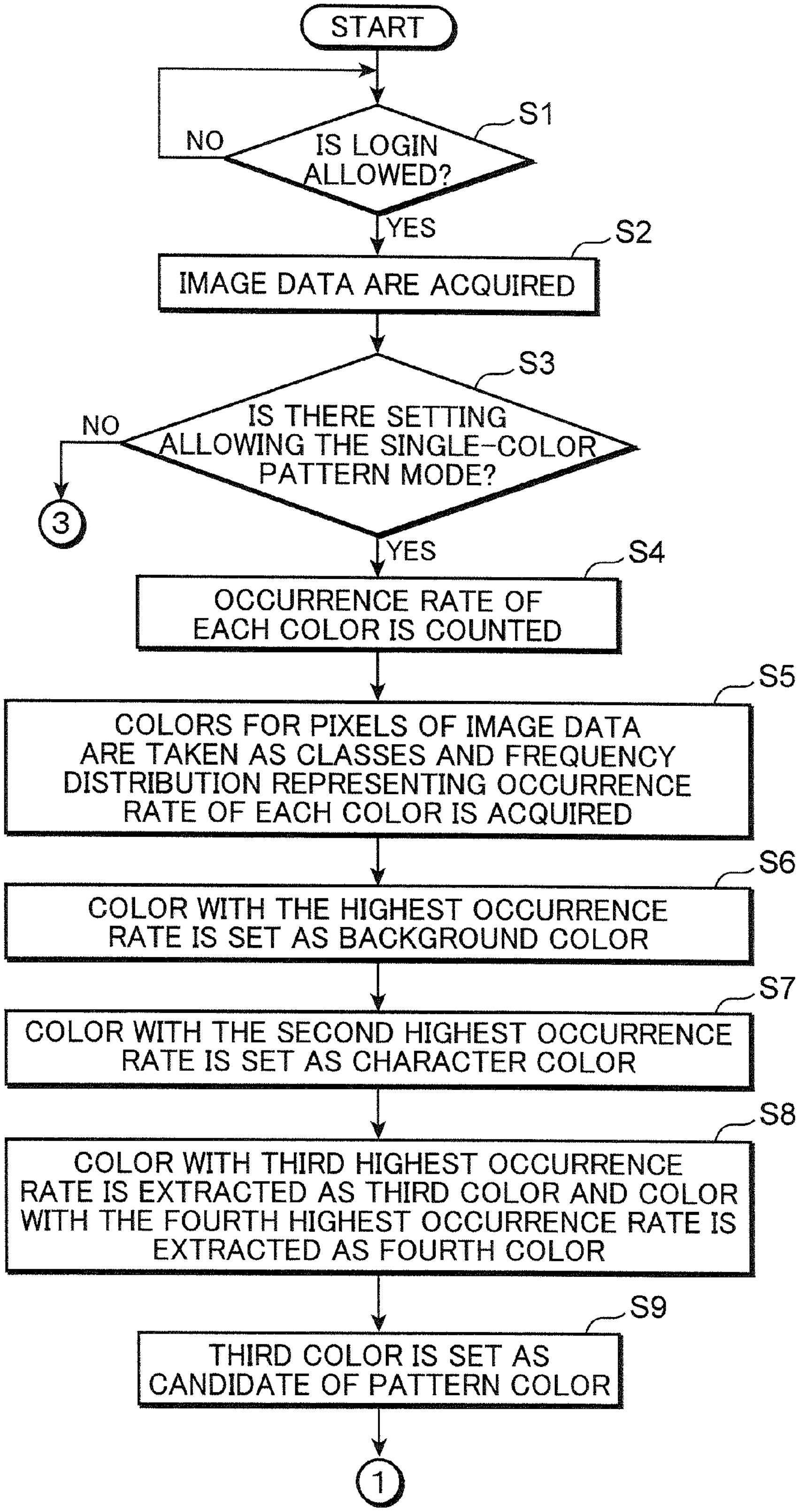
FIG. 5 is a flowchart illustrating an example of operation of the image forming apparatus shown in FIG. 2.

The processing performed in steps S1 and S2 is similar to that of steps S1 and S2 shown in FIG. 5. In step S1, the identification information of the user that has logged in is assumed to be registered as the monochromatic-restricted user in the management unit 17*a*. In the flowcharts shown in FIGS. 16 to 18 below, the processing relating to the monochromatic-restricted user is explained.

Then, the image formation control unit 16*a* determines by referring to the management unit 17*a* whether or not the pattern mode allowing setting has been made with respect to the monochromatic-restricted user that was allowed to log in, that is, whether or not the implementation of the full-color pattern mode of single-color pattern mode has been allowed to the login user (step S103).

When the pattern mode allowing setting has not been made with respect to the login user (NO in step S103), the image formation control unit 16*a* implements the monochromatic mode and prints the image data D by using only the black (K) color toner (step S104).

Then, the image formation control unit 16*a* updates the charting information of the user (step S105). For example, the image forming apparatus 1*a* registers in advance in the management unit 17*a* a fee that should be charged to the user as the charging information for each user identification information, and after the image has been formed in the monochromatic mode, successively registers the fee corresponding to the implemented mode as the charging information corresponding to the user identification information.

Since the fee corresponding to the implemented mode is thus successively registered as the charging information, the fee to be charged to the user can be easily determined.

When the pattern mode allowing setting has been made with respect to the login user (YES in step S103), the image formation control unit 16*a* advances to step S4. When the image formation control unit 16*a* does not have the single-color pattern mode, in step S103 the image formation control unit 16*a* may advance to step S4 when the implementation of the full-color pattern mode is allowed. Then, steps S4 to S8 similar to those shown in FIG. 5 are implemented.

After step S8 has been implemented, the color setting unit 100 assumes that the color with an occurrence rate lower than that of the second color is the pattern color constituting the specific pattern and advances to step S10. The processing of steps S10 to S12 is then implemented by the color setting unit 100 in the same manner as shown in FIG. 6.

When the (OTHERS) in step S12 is less than the size determination value tf1 (YES in step S12), the color setting unit 100 assumes that the size of the specific pattern is small and advances to the processing of step S114.

When the (OTHERS) is equal to or greater than the size determination value tf1 (NO in step S12), the color setting unit 100 sends information indicating that the (OTHERS) is equal to or greater than the size determination value tf1 to the image formation control unit 16*a*. When the (OTHERS) is equal to or greater than the size determination value tf1, the surface area of the specific pattern is considered to be large, and the inconvenient consequence of implementing the pattern mode is that the cost rises since chromatic toners are used for printing. Accordingly, when the (OTHERS) is equal to or greater than the size determination value tf1, the image formation control unit 16*a* advances to step S26 in which a printing mode should be selected on the basis of the character color, without implementing the pattern mode, even if the implementation of the pattern mode has been allowed. The processing of steps S26 to S28 is then implemented in the same manner as in FIG. 6.

Instead of the processing of step S12, the color setting unit 100 may determine whether or not the ratio {(SUM1)/(total number of pixels)} of the sum (SUM1) of occurrence rates of the first color and the second color to the total number of pixels in the color image is equal to or greater than a reference ratio that has been set in advance.

When the service provider set the fee for printing that increases with the size of recording paper where the specific pattern should be printed, where the ratio of the specific image in the entire color image is less than a predetermined ratio, the ratio of the cost of chromatic toner in the fee is small.

Accordingly, when the ratio {(SUM1)/(total number of pixels)} is equal to or greater than the reference ratio, the ratio of the specific pattern in the entire image can be considered to be small and therefore the processing advances to step S114 and the pattern mode is implemented. However, where the ratio {(SUM1)/(total number of pixels)} is less than the reference ratio, the ratio of the specific pattern in the entire image can be considered to be large and therefore the processing advances to step S26, the monochromatic mode or monocolor mode is implemented, and the fee corresponding to the respective image formation mode is charged. As a result, the user can be provided with the service of printing the specific pattern by using chromatic toners, without the service provider incurring losses.

In step S114, the color setting unit 100 determines whether or not the occurrence frequency of the fourth color is equal to or greater than the multiple color determination value tf12 that has been set in advance (step S114). Where the occurrence rate of the fourth color is equal to or greater than the predetermined value, the specific pattern can be considered to be constituted by a plurality of colors including at least the third color and the fourth color.

Accordingly, when the occurrence rate of the fourth color is less than the multiple color determination value tf12 (YES in step S114), the color setting unit 100 advances to step S115, and when the occurrence rate of the fourth color is equal to or greater than the multiple color determination value tf12 (NO in step S114), the color setting unit 100 assumes that the specific pattern includes a plurality of colors and performs the setting of the full-color pattern mode (step S118).

For example, when the multiple color determination value tf12 is 1, in the example shown in FIG. 4A, the occurrence rate of the fourth color represented by the logo color 2 is 20 and greater than the multiple color determination value tf12. Therefore, the color setting unit 100 assumes that the logo mark L includes a plurality of colors and sets the full-color pattern mode.

In step S115, the color setting unit 100 calculates the sum (SUM4) of the occurrence rates of the third color and the fourth color.

The color setting unit 100 then determines whether or not the value obtained by subtracting the SUM4 from the value (OTHERS) acquired in step S11, that is, the value obtained by subtracting the sum of the occurrence rates of the third color and the fourth color from the total number of pixels in the color image, is equal to or greater than the additional multiple color determination value tf13 that has been set in advance (step S116). The reasons for performing the processing of step S116 will be explained below.

For example, when the multiple color determination value tf12 is 1, in the example shown in FIG. 4B, the occurrence rate of the fourth color represented by the logo color 2 is 0.5 and less than the multiple color determination value tf12. Therefore, the color setting unit 100 can assume that the logo mark L has a single color.

However, when the multiple color determination value tf12 is 1, in the example shown in FIG. 4C, the occurrence rate of the fourth color represented by the logo color 2 is also 0.5 and the logo mark L is assumed to have a single color. In this case, although the logo mark L is a multicolor logo including a plurality of colors, the logo mark L is erroneously considered to have a single color.

Thus, the processing of step S116 is performed in order to reduce the probability of erroneously determining that the specific pattern including a plurality of colors has a single color.

When in step S116 the value obtained by subtracting the sum of the occurrence rates of the first to fourth colors from the total number of pixels in the color image, that is, the sum of the occurrence rates of the color with the fifth highest occurrence rate and the colors with even lower occurrence rates, is less than the additional multiple color determination value tf13 (YES in step S116), the color setting unit 100 determines that the specific pattern is of a single color and sets the single-color pattern mode (step S117).

In the example of the single-color logo shown in FIG. 4B, the value obtained by subtracting the sum total of the occurrence rates of the first to fourth colors from the total number of pixels in the color image is described as "sum for fifth and subsequent numbers". For example, when the additional multiple color determination value tf13 is 1, the "sum for fifth and subsequent numbers" is 0.5 in FIG. 4B and the "sum for fifth and subsequent numbers" is less than the additional multiple color determination value tf13. Therefore, the single-color pattern mode is set.

The specific pattern is determined to have a single color for the following reason when the occurrence rate of the fourth color is less than the multiple color determination value tf12 in step S114, and the sum total value of occurrence rates of the color with the fifth highest occurrence rate and the colors with even lower occurrence rates is less than the additional multiple color determination value tf13 in step S116.

Thus, when the specific pattern has a single color, in the image data D that have been read by the image reading unit 200, the pixels on the periphery of the specific pattern are sometimes read as pixels with the color close to that of the specific pattern because of the color spreading in the specific pattern. Thus, the color occurring due to the color spread in the specific pattern is sometimes the fourth color. In such a case, for example, where the specific color is determined to include a plurality of colors when the total value of the occurrence rates of the color with the fourth highest occurrence rate and colors with even lower occurrence rate, including the fourth color, is equal to or greater than the additional multiple color determination value tf13 in step S116, it is possible that the single-color specific pattern will be erroneously determined as a pattern including a plurality of colors due to the effect of the color generated by the color (third color) spread in the specific pattern.

Meanwhile, even when the occurrence rate of the fourth color is less than the multiple color determination value tf12 in step S114, the specific pattern is sometimes constituted by using a very large number of colors, each taken in a very small amount. In such a case, even when the occurrence rate of the fourth color is a very small value less than the multiple color determination value tf12, the total value of the occurrence rates of the color with the fifth highest occurrence rate and colors with even lower occurrence rate is large and exceeds the additional multiple color determination value tf13.

Accordingly, the accuracy of determining whether the specific pattern includes a single color or a plurality of colors is increased by determining that the specific pattern includes a plurality of colors when the total value of the occurrence rates of the color with the fifth highest occurrence rate and colors with even lower occurrence rate, excluding the fourth color, is equal to or greater than the additional multiple color determination value tf13 in step S116.

When the single-color pattern mode is set in step S117, the color setting unit 100 notifies the image formation control unit 16*a* of the fact that only the third color has been set as the pattern color of the specific pattern and the single-color pattern mode has been set and the fact that only the third color has been set as the pattern color of the specific pattern.

In such a case, the image formation control unit 16*a* implements the single-color pattern mode, prints the specific pattern by using the color toner of the pattern color that has been set by the color setting unit 100, and prints the characters C by using the color toner of the second color, for example the black toner.

Meanwhile, when the value obtained by subtracting the sum of the occurrence rates of the first to fourth colors from the total number of pixels in the color image is equal to or greater than the additional multiple color determination value tf13 (NO in step S116), the color setting mode 100 sets the full-color pattern mode (step S118).

For example, when the additional multiple color determination value tf13 is 1, in the example shown in FIG. 4C, the "sum for fifth and subsequent numbers" is 40.5 and greater than the additional multiple color determination value tf13. Therefore, the full-color pattern mode is set.

When the color setting mode 100 has set the full-color pattern mode (step S118), all of the colors with the occurrence rate lower than that of the second color are set as the pattern colors (step S122). For example, the color setting mode 100 sets all of the colors from the third color to the sixth color as the pattern colors.

The image formation control unit 16*a* then performs the processing of steps S123 and S124.

Where the color of characters C in the image data D is other than black, expensive chromatic toners, that is, color toners of cyan, magenta, and yellow colors are used for representing the color of the characters C. In this case, the printing cost of the image data D increases.

For this reason, the image formation control unit 16*a* implements the 100% UCR processing with the undercolor removal unit 104 and replaces the second color with black (step S123).

Since the second color is thus replaced with black, even when the character color is other than black, for example, a chromatic color such as gray or Prussian blue, the characters are printed with the black toner and therefore the printing cost can be reduced.

The image formation control unit 16*a* implements the full-color pattern mode and causes the image forming unit 40 to print the characters C by using the black toner and print the specific pattern by using a chromatic color toner (step S124). In this case, in step S124, the image forming unit 40 represents the pattern color that has been set in step S122 with the chromatic color toner.

For example, the image forming unit 40 represents the deep green color or red color by mixing cyan, magenta, and yellow at predetermined ratios to represent the respective colors.

After the processing of step S124 has been performed, the image forming apparatus 1*a* updates charging information of the user (step S125). For example, the image forming apparatus 1*a* registers in advance the fee that should be charged to the user as the charging information for each identification information of the user in the management unit 17*a* and after the image formation in the full-color pattern mode has been executed, successively registers the fee corresponding to the implemented mode as the charging information corresponding to the identification information of the user.

Since the fee corresponding to the full-color pattern mode is thus successively recorded as the charging information, it can be easily determined how much the user should be charged.

Similarly to the image forming apparatus 1, the image forming apparatus 1*a* may use the color groups instead of the colors and use the occurrence rates of the color groups instead of the occurrence rates of the colors. In this case, as described hereinabove, the colors of the first color group G(1) are the first colors, the colors of the second color group G(2) are the second colors, and the colors of the third color group G(3) are the third colors. The N-th colors (N is any integer) are formed in a similar manner.

Then, in step S122, the color setting unit 100 selects all of the colors with the occurrence rate lower than that of the second color, for example, the third to sixth colors. Then, the color setting unit 100 may set as the pattern colors the four colors with the highest occurrence rate with respect, for example, to each of the plurality of colors included in the third to sixth colors (a plurality of colors for which the density value is represented by all 8 bits, including the low-order bits).

The processing of setting as the pattern color the color with the highest occurrence rate with respect to each of the plurality of colors included in the third to N-th colors can be implemented by a method similar to that of the processing of setting as the pattern color the color with the highest occurrence rate from among the plurality of colors included in the third colors shown in FIG. 14.

Further, in another possible configuration, the image forming apparatus 1*a* is not provided with the management unit 17*a*, operation input unit 18, first setting unit 101, second setting unit 102, third setting unit 103, fourth setting unit 105, fifth setting unit 106, undercolor removal unit 104, and image processing unit 120, does not perform the processing of steps S1, S103, S114 to S117, S123 to S125, S104, and S105, and performs the following processing.

The image forming apparatus 1*a* successively implements steps S2, S4 to S8, and S10 to S12, where YES is obtained in step S12, implements steps S118 and S122, and sets a plurality of colors with the occurrence rate lower than that of the second color as the pattern colors. As a result, reproducibility of pattern colors (colors of the pattern) when the image including the pattern of chromatic colors is printed can be increased. Then, step S123 is implemented. Alternatively, step S124 may be additionally implemented. Where NO is obtained in step S12, the processing may be ended or image formation in the full-color mode, monochromatic mode, or mono-color mode may be implemented.

Further, it is also possible to implement successively steps S2, S4 to S8, S10 to S12, and S114, where NO is obtained in step S114, implement steps S118 and S122, and set a plurality of colors with an occurrence rate lower than that of the second color as the pattern colors. Where YES is obtained in step S114, it is possible to advance to step S117 or end the processing, without implementing steps S115 and S116.

In another possible configuration, steps S2, S4 to S8, S10 to S12, S114 to S118, and S122 are implemented.

Thus, an image forming apparatus according to one aspect of the present invention includes: an image data acquisition unit that acquires image data representing a color image; a frequency distribution acquisition unit that allocates a color of each pixel of the image data as a class and acquires a frequency distribution representing an occurrence rate of the each color on the basis of the image data acquired by the image data acquisition unit; and a color setting unit that sets a first color that is a color with the highest occurrence rate in the frequency distribution acquired by the frequency distribution acquisition unit as a background color in the color image, sets a second color that is a color with an occurrence rate next in magnitude to the first color as a character color in the color image, and sets a color with an occurrence rate lower than that of the second color as a pattern color that is a color of a specific pattern in the color image.

The specific pattern as referred to herein means an image that is different from the characters, for example, a logo mark, an underlining line, and a marker. In a typical document, characters are printed on a white sheet. A pattern such as a logo mark or underlining lines of chromatic colors are often included in such a document. Thus, in the image in which a larger part is taken by characters and chromatic colors are present in part thereof, that is, in the image in which the number of pixels of the pattern is less than a size determination value that has been set in advance, the white color of the sheet is the background of the image. Therefore, from among the colors included in the image data of such a document, white has the highest occurrence rate. The characters have the color with an occurrence rate that is next in magnitude to the white color.

Accordingly, with this configuration, the first color that is the color with the highest occurrence rate is set as the background color in the color image, the second color that is the color with the occurrence rate next in magnitude to the first color is set as the character color in the color image, and the color with an occurrence rate lower than that of the second color is set as a pattern color that is the color of the specific pattern in the color image. Therefore, reproducibility of the color of the pattern can be increased when the image including the pattern of a chromatic color is printed.

Further, it is preferred that when a determination condition is satisfied that includes as a condition that a difference between a sum of the occurrence rates of predetermined object colors including a third color that is a color with an occurrence rate next in magnitude to the second color, the first color, and the second color and a total number of pixels of the color image is less than a pattern determination value that has been determined in advance, the color setting unit set the third color as the pattern color.

Where the difference between the sum of the occurrence rates of the first color, second color, and third color and the total number of pixels of the color image is a large value that is equal to or greater than the first reference rate, the occurrence rate of the color other than the first color, second color, and third color, for example, the fourth color or fifth color, can be high. In this case, it is highly probable that the pattern includes a plurality of colors.

Where the difference between the sum of the occurrence rates of the first color, second color, and third color and the total number of pixels of the color image is a small value that is less than the first reference rate, it can be assumed that the color image does not include any color other than the first color, second color, and third color. In this case, it is highly probable that the pattern is constituted by a single color which is the third color.

Accordingly, with such a configuration, when the difference between the occurrence rate of the predetermined object colors including the first color, second color, and third color and the total number of pixels of the color image is less than the pattern determination value, the third color is set as the pattern color. As a result, the third color is set as the pattern color when it is highly probable that the specific pattern is constituted by a single color which is the third color.

Therefore, for example, when a pattern of one chromatic color is included in a white-and-black image, the chromatic color is set as the pattern color and printing of the pattern is performed by using a toner of the pattern color. As a result, reproducibility of the color of the pattern can be increased when the image including the pattern of one chromatic color is printed.

It is preferred that the object colors include a fourth color that is a color with an occurrence rate next in magnitude to the third color, the third color, the first color, and the second color; the determination condition further include as a condition that the occurrence rate of the fourth color is less than an additional pattern determination value that has been determined in advance; and the color setting unit set the third color as the pattern color when all of the conditions included in the determination condition are satisfied.

Where the difference between the sum of the occurrence rates of the first color, second color, third color, and fourth color and the total number of pixels of the color image is less than the second reference rate, it is possible that the occurrence rate of a color other than the first to fourth colors, for example, the fifth color or the sixth color, is low and that the pattern color is the third color or the fourth color.

Further, when the occurrence rate of the fourth color is less than the additional pattern determination value, it is highly probable that the pattern is constituted by a single color which is the third color.

Accordingly, with such a configuration when the first condition is satisfied and the occurrence rate of the fourth color is less than the additional pattern determination value, the third color is set as the pattern color. Therefore, the accuracy of setting the pattern color of the pattern constituted by a single color is increased.

It is preferred that the determination condition further include as a condition that the occurrence rate of the third color is less than an auxiliary size determination value that has been set in advance; and the color setting unit set the third color as the pattern color when all of the conditions included in the determination condition are satisfied.

Where the occurrence rate of the third color is a large value that is equal to or greater than the auxiliary size determination value, it is highly probable that the image area of the pattern of the third color that is considered the pattern color is large. Meanwhile where the occurrence rate of the third color is a small value that is less than the auxiliary size determination value, it is highly probable that the image area of the pattern of the third color that is considered the pattern color is small.

With such a configuration, the color setting unit sets the third color as the pattern color when the occurrence rate of the third color is less than the auxiliary size determination value that has been set in advance. Therefore, the third color is set as the pattern color and the pattern is printed by using the color toner of the third color only when it is highly probable that the image area of the pattern is small.

As a result the amount of the expensive chromatic color toner that is consumed on the printing of the pattern is small. Therefore, reproducibility of the chromatic color of the pattern can be increased, while reducing the printing cost.

Further, by using a configuration in which the auxiliary size determination value can be changed as appropriate, it is possible to set flexibly according to the customer's wish or circumstances of the service provider the size of the image area of the specific pattern at which the single-color pattern mode is to be provided to the user that can implement only the monochromatic mode.

It is preferred that the image data acquisition unit represent the color of each of the pixels by density values of three primary colors that have been set in advance; the frequency distribution acquisition unit arrange the colors as the classes on three-dimensional coordinates by allocating each of the density values to each coordinate of three-dimensional coordinates, and generate three-dimensional frequency distribution information in which the frequency distribution is represented in three-dimensional coordinates, by associating each of the colors with the occurrence rate; and the color setting unit set the third color by excluding colors which are arranged on a path connecting linearly the first color and the second color on three-dimensional coordinates in the three-dimensional frequency distribution information and for which a distance from the first color on the three-dimensional coordinates exceeds a determination distance that has been set in advance and a distance from the second color exceeds the determination distance.

Since the first color is considered a background color and the second color is considered a character color, it is highly probable that the color arranged on the path connecting linearly the first color and the second color on the three-dimensional coordinates is a color generated by the spread of character color or the character color of reduced density. Accordingly, by setting the third color by excluding such colors, it is possible to increase further the reproducibility of the third color, that is, the pattern color.

It is also preferred that the image data acquisition unit represent the color of each of the pixels by density values of three primary colors that have been set in advance and represent each of the density values by the number of basic bits that has been set in advance; the frequency distribution acquisition unit allocate each of high-order bits that have been set in advance in the density values of the primary colors to each coordinate of three-dimensional coordinates, thereby arranging, as the classes, color groups that are groups of colors for which the high-order bits of the primary colors are common on the three-dimensional coordinates, and acquires a frequency distribution of each of the color groups as three-dimensional frequency distribution information by associating each of the color groups with each of the occurrence rates of the color groups; and the color setting unit use the color groups instead of the colors, and set a color group to be the third color by excluding color groups of a region obtained by excluding a first region for which a distance from a color group to be the first color on the three-dimensional coordinates is less than a Euclid distance that has been set in advance and a second region for which a distance from a color group to be the second color on the three-dimensional coordinates is less than the Euclid distance, from a region formed by connecting linearly the first region and the second region.

With such a configuration, the volume of data handled by the frequency distribution acquisition unit or color setting unit is reduced by using color groups instead of colors. Further, it is highly probable that the color groups of the region obtained by excluding the first region and the second region from the region formed by connecting linearly the first region and the second region is a color caused by the spread of the character color or the character color with reduced density. Accordingly, by excluding these color groups when setting the color group to be the third color, it is possible to set the third color with good accuracy with a simpler hardware configuration of the frequency distribution acquisition unit than in the case in which the frequency distribution representing the occurrence rate of each color is acquired by using all of the basic bits.

It is also preferred that the image forming apparatus further include: an identification information input unit that receives an input of identification information of a user; a management unit in which identification information of a user that can implement only a monochromatic mode of forming an image based on the image data by only one color has been registered in advance; a setting unit that receives a setting as to whether to allow an implementation of a single-color pattern mode in which characters in the color image are printed by using a color toner of the second color that has been set by the color setting unit and the pattern is printed by using a color toner of the third color that has been set by the color setting unit, with respect to a user having the identification information of the user that can implement only the monochromatic mode, which has been registered in the management unit; and a control unit that implements image formation in the monochromatic mode and the single-color pattern mode, wherein when the identification information input unit receives an input of identification information of the user that can implement only the monochromatic mode, and when the setting unit receives a setting allowing the implementation of the single-color pattern mode to the user having this identification information, the control unit allows the implementation of the monochromatic mode and the single-color pattern mode to the user that can implement only the monochromatic mode.

In the service providing printing of image data, different fees are usually charged to the user for the monochromatic mode (monochromatic copying) and the full-color mode (color copying). In such cases, the fee in the monochromatic mode is most often less than that in the full-color mode.

However, when black-and-white images are the main components and specific images such as logo marks, underlining lines, and markers are present only in a small portion, as in business documents of companies, it is desirable for the user that the black-and-white images be printed in black and white and the specific images be printed in color.

Further, when the image area of the specific images such as logo marks, underlining lines, and markers is small, the amount of color toner consumed in the single-color pattern mode is very small. Therefore, the cost required for the single-color pattern mode increases only slightly over than in the monochromatic mode. For this reason even when the fee in the single-color pattern mode is set equal or only slightly higher than that in the monochromatic mode, the service provider incurs no losses.

With the above-described configuration, when a setting that allows the implementation of the single-color pattern mode is made for the user that has been registered as the user that can implement only the monochromatic mode, the single-color pattern mode can be implemented.

As a result, where the setting that allows the implementation of the single-color pattern mode has been made and the image area of the specific image is small, the single-color pattern mode in which the specific pattern is printed with the pattern color is easily provided at a low cost to the user that can implement only the monochromatic mode.

Further, it is preferred that the image forming apparatus further include an image processing unit that performs background color change processing of changing a background color in the color image to a color that has been determined in advance in the image data.

With such a configuration, even when the pixels that should be of a background color become pixels of a different color in the color image, for example, when the density of the base surface in the original document with the color image is high or the back page of the original document is seen through, the color of the pixels that inherently should have the background color is replaced with the background color.

As a result, the background color, character color, and pattern color in the color image can be truthfully reproduced.

Further, it is also preferred that the color setting unit set a plurality of colors with an occurrence rate lower than that of the second color in the frequency distribution as the pattern color; and determine whether or not to set a full-color pattern mode that is a mode in which the specific pattern is printed by using the pattern color on the basis of the occurrence rates of any color from among the colors with the occurrence rate lower than that of the second color, the first color, and the second color; and the image forming apparatus further include a control unit that prints characters in the color image by using a color toner of the second color and prints the specific pattern by using a color toner of the pattern color when the full-color pattern mode is set by the color setting unit.

The full color herein means a plurality of colors.

With such a configuration, it is assumed that the specific pattern with a plurality of chromatic colors is included in part of the color image and the full-color pattern mode is set on the basis of the occurrence rates of any color from among a plurality of colors with an occurrence rate lower than that of the black color in the color image, the background color, and the character color, and a plurality of colors with an occurrence rate lower than that of the character color is set to the pattern color.

The full-color pattern mode is then implemented, the characters are printed by the toner of the second color, and the specific pattern is printed by the toner of the pattern color that has been set by the color setting unit.

As a result, when an image including a specific pattern constituted by a plurality of chromatic colors in part of the image is printed, reproducibility of the chromatic colors of the specific pattern can be increased.

Further, it is preferred that the color setting unit set the full-color pattern mode when a difference between the total number of pixels in the color image and a sum of the occurrence rates of the first color and the second color is less than a size determination value that has been set in advance, and the occurrence rate of a fourth color that is a color with an occurrence rate next in magnitude to the third color having an occurrence rate next in magnitude to the second color is equal to or greater than a multiple color determination value that has been set in advance.

When the difference between the sum of the occurrence rates of the first color that is considered a background color and the second color that is considered a character color and the total number of pixels in the color image is less than the size determination value, the surface area of the specific pattern with a color other than the first color and the second color, that is, the color that is considered a pattern color, can be considered to be small.

It is also highly probable that where the occurrence rate of the fourth color is a large value that is equal to or greater than the multiple color determination value, the pattern color includes a plurality of colors.

Accordingly, with the above-described configuration, the full-color pattern mode is set and the specific color is printed by using toners of chromatic colors only when the specific pattern has a small image area and has two or more chromatic colors. As a result, the consumption of expensive chromatic color toners on printing of the specific pattern can be reduced and therefore reproducibility of the chromatic colors of the specific pattern can be increased, while reducing the printing cost.

Further, it is also preferred that the color setting unit set the full-color pattern mode when a difference between the total number of pixels in the color image and a sum of the occurrence rates of the first color and the second color is less than a size determination value that has been set in advance, the occurrence rate of a fourth color that is a color with an occurrence rate next in magnitude to the third color having an occurrence rate next in magnitude to the second color is less than a multiple color determination value that has been set in advance, and a difference between a sum of the occurrence rates of the first color, the second color, the third color, and the fourth color and the total number of pixels in the color image is equal to or greater than an additional multiple color determination value that has been set in advance.

When the difference between the total number of pixels in the color image and the sum of the occurrence rates of the first color and the second color is less than the size determination value, the surface area of the specific pattern is considered to be small. Further, where the occurrence rate of the fourth color is less than the multiple color determination value, it is highly probable that the color of the specific pattern is a single color which is the third color. However, even if the occurrence rate of the fourth color is less than the multiple color determination value, where the difference between the sum of the occurrence rates of the first color, second color, third color, and fourth color and the total number of pixels in the color image is equal to or greater than the additional multiple color determination value, it is highly probable that the specific pattern is constituted by a large number of colors with an extremely low occurrence rate.

Accordingly, with the above-described configuration, even if the occurrence rate of the fourth color is less than the multiple color determination value, where the difference between the sum of the occurrence rates of the first color, second color, third color, and fourth color and the total number of pixels in the color image is equal to or greater than the additional multiple color determination value, the color setting unit determines that the specific pattern is constituted by a plurality of colors and sets the full-color pattern mode. As a result, the accuracy of determining whether the specific pattern is constituted by a single color or a plurality of colors is increased.

Further, it is preferred that the color setting unit sets the full-color pattern mode when a ratio of a sum of the occurrence rates of the first color and the second color to the total number of pixels in the color image is equal to or greater than a reference ratio that has been set in advance, and the occurrence rate of a fourth color that is a color with an occurrence rate next in magnitude to a third color having an occurrence rate next in magnitude to the second color is equal to or greater than a multiple color determination value that has been set in advance.

When the ratio of the sum of the occurrence rates of the first color and the second color to the total number of pixels in the color image is small and less than the reference ratio, it is highly probable that the ratio of the specific pattern of a color with an occurrence rate lower than that of the second color in the entire image is large. Where the ratio of the surface area of the specific pattern in the entire image is large, even if the printing fee is set to increase with the increase in the size of recording paper where the specific pattern is to be printed, since the cost ratio of the chromatic toner in the fee is high, the service provider can incur losses. Further, where the occurrence rate of the fourth color is equal to or greater than the multiple color determination value, it is highly probable that the pattern color includes a plurality of colors.

Accordingly, with the above-described configuration, the full-color pattern mode is set when the ratio of the sum of the occurrence rates of the first color and second color to the total number of pixels in the color image is equal to or greater than the reference ratio and therefore the ratio of the specific pattern in the entire image is small, and the occurrence rate of the fourth color is equal to or greater than the second reference rate that has been set in advance.

As a result, where a specific pattern including two or more chromatic colors is included in the image and the ratio of the specific image in the entire image is equal to or greater than a predetermined value, the full-color pattern mode is not set and therefore the cost ratio of the chromatic color toners in the fee is restricted to a low range.

For this reason, where the service provider sets a printing fee that increases with the increase in the recording paper size where the specific pattern is to be printed, the user can be provided with a printing service using chromatic colors for the specific pattern, without the service provider incurring losses.

Further, it is preferred that the image data acquisition unit represent the color of each of the pixels by density values of three primary colors that have been set in advance; the frequency distribution acquisition unit arrange the colors as the classes on three-dimensional coordinates by allocating each of the density values to each coordinate of three-dimensional coordinates, and generate three-dimensional frequency distribution information in which the frequency distribution is represented in three-dimensional coordinates, by associating each of the colors with the occurrence rate; and the color setting unit set the pattern color on the basis of an order of occurrence rates of colors remaining after excluding colors which are arranged on a path connecting linearly the first color and the second color on three-dimensional coordinates in the three-dimensional frequency distribution information and for which a distance from the first color on the three-dimensional coordinates exceeds a determination distance that has been set in advance and a distance from the second color exceeds the determination distance.

Since the first color is considered a background color and the second color is considered a character color, it is highly probable that the color arranged on the path connecting linearly the first color and the second color on the three-dimensional coordinates is a color generated by the spread of character color or the character color of reduced density. Accordingly, by setting the pattern color by excluding such colors, it is possible to increase further the reproducibility of the pattern color.

It is also preferred that the image data acquisition unit represent the color of each of the pixels by density values of three primary colors that have been set in advance and represent each of the density values by the number of basic bits that has been set in advance; the frequency distribution acquisition unit allocate each of high-order bits that have been set in advance in the density values of the primary colors to each coordinate of three-dimensional coordinates, thereby arranging, as the classes, color groups that are groups of colors for which the high-order bits of the primary colors are common on the three-dimensional coordinates, and acquire a frequency distribution of each of the color groups as three-dimensional frequency distribution information by associating each of the color groups with each of the occurrence rates of the color groups; and the color setting unit use the color groups instead of the colors, and set the pattern color on the basis of an order of occurrence rates of color groups remaining after excluding color groups of a region obtained by excluding a first region for which a distance from a color group to be the first color on the three-dimensional coordinates is less than a Euclid distance that has been set in advance and a second region for which a distance from a color group to be the second color on the three-dimensional coordinates is less than the Euclid distance, from a region formed by connecting linearly the first region and the second region.

With such a configuration, the volume of data handled by the frequency distribution acquisition unit or color setting unit is reduced by using color groups instead of colors. Further, it is highly probable that the color groups of the region obtained by excluding the first region and the second region from the region formed by connecting linearly the first region and the second region is a color caused by the spread of the character color or the character color with reduced density. Accordingly, by excluding these color groups when setting the color group to be the pattern color, it is possible to set the pattern color with good accuracy with a simpler hardware configuration of the frequency distribution acquisition unit than in the case in which the frequency distribution representing the occurrence rate of each color is acquired by using all of the basic bits.

It is also preferred that the colors of the pixels be represented by density values of cyan, magenta, and yellow, or red, green, and blue; and the image forming apparatus further include: an image forming unit that performs image formation by using the cyan, the magenta, and the yellow, or the red, the green, the blue, and a black toner; and an undercolor removal unit that replaces, with black, a portion corresponding to gray among the density values in the pixels; and the undercolor removal unit perform 100% UCR processing of replacing the second color with the black when the full-color pattern mode is set by the color setting unit.

Printing a document including a specific pattern such as a logo mark, underlining lines, and markers in a full-color mode can be considered as a means for improving reproducibility of colors of the specific pattern. However, in the full-color mode, the characters are most often printed by mixing chromatic toners, which are more expensive than a black toner, to obtain a black color, without using the black toner. In such a case, the printing of characters is more expensive than in the case where the characters are printed using the black toner.

With the above-described configuration, the undercolor removal unit usually performs the so-called UCR (undercolor removal) processing of replacing the portions corresponding to gray among the density values of cyan, magenta, and yellow, or red, green, and blue with black for each pixel.

When the full-color pattern mode is set by the color setting until, the undercolor removal unit replaces the second color that is considered a character color with black at a ratio of 100%. In such a case, when the full-color pattern mode is set, since the second color is replaced with black, the characters are printed with the black toner when the full-color pattern mode is implemented.

As a result, the printing cost can be reduced by comparison with the case where the character color is produced by mixing a plurality of expensive chromatic color toners, and a fee for full-color pattern mode can be reduced.

It is also preferred that the image forming apparatus further include an identification information input unit that receives an input of identification information of a user; a management unit in which identification information indicating a monochromatic-restricted user, which is a user that can implement only a monochromatic mode, has been registered in advance; and a first setting unit that receives a setting as to whether to allow an implementation of the full-color pattern mode to the monochromatic-restricted user, wherein when the first setting unit receives a setting allowing the implementation of the full-color pattern mode to the monochromatic-restricted user and the identification information input unit receives an input of identification information indicating the monochromatic-restricted user, the control unit allows the implementation of the monochromatic mode and the full-color pattern mode to the monochromatic-restricted user.

In the service providing printing of image data, different fees are usually charged to the user for the monochromatic mode (monochromatic copying) and the full-color mode (color copying). In such cases, since the color toners used in the full-color mode are more expensive than the black toner used in the monochromatic mode, the fee in the monochromatic mode is most often less than that in the full-color mode.

However, when black-and-white images are the main components and specific images such as logo marks, underlining lines, and markers are present only in a small portion, as in business documents of companies, it is desirable for the user that the black-and-white images be printed in black and white and the specific images be printed in color.

Further, when the image area of the specific images such as logo marks, underlining lines, and markers is small, the amount of color toner consumed in the full-color pattern mode is very small. Therefore, the cost required for the full-color pattern mode increases only slightly over than in the monochromatic mode. For this reason even when the fee in the full-color pattern mode is set equal or only slightly higher than that in the monochromatic mode, the service provider incurs no losses.

With the above-described configuration, when a setting that allows the implementation of the full-color pattern mode is made for the user that has been registered as the user that can implement only the monochromatic mode, the full-color pattern mode can be implemented. As a result, where the setting that allows the implementation of the full-color pattern mode has been made and the image area of the specific image is small, the full-color pattern mode in which the specific pattern is printed with the pattern colors is easily provided at a low cost to the user that can implement only the monochromatic mode.

It is also preferred that the image forming apparatus further include a second setting unit for setting at least the size determination value.

With such a configuration, the service provider can set flexibly according to the customer's wish or circumstances of the service provider the small size of the specific image at which the full-color pattern mode is to be set.

It is also preferred that the image forming apparatus further include a third setting unit for setting at least the reference ratio.

With such a configuration, the service provider can set flexibly according to the customer's wish or circumstances of the service provider the small size of the ratio of the specific image to the entire image at which the full-color pattern mode is to be set.

It is also preferred that the image forming apparatus further include an image processing unit that performs background color change processing of changing the background color to a predetermined color in the image data.

With such a configuration, the background color in the color image is changed to the predetermined color. As a result, when the pixels that should be of a background color become pixels of a different color in the color image, for example, when the density of the base surface in the original document with the color image is high or the back page of the original document is seen through, the color of the pixels that inherently should have the background color is replaced with the background color. As a result, the background color, character color, and pattern color in the color image can be truthfully reproduced.

It is also preferred that the image data acquisition unit represent the color of each of the pixels by density values of three primary colors that have been set in advance and represent the density values by the number of basic bits that has been set in advance; the frequency distribution acquisition unit acquire the frequency distribution by taking, as the classes, the color groups that are groups of colors for which high-order bits that have been set in advance in the number of basic bits of the density values are common for each of the primary colors; and the color setting unit use the color groups instead of the colors to determine whether or not to set the full-color pattern mode on the basis of occurrence rates of any color group from among a plurality of color groups with an occurrence rate lower than that of the second color group which is the color group with the second highest occurrence rate in the frequency distribution, the first color group which is the color group with the highest occurrence rate, and the second color group, and set, as the pattern colors, a plurality of colors obtained by selecting respective colors with the highest occurrence rate in respective color groups with an occurrence rate lower than that of the second color group.

With such a configuration, the frequency distribution acquisition unit acquires the frequency distribution that represents the occurrence rates of color groups for which high-order bits, which are part of the basic bits, are common, by contrast with the case in which the frequency distribution representing the occurrence rate of each color is acquired using all of the basic bits. Further, the color setting unit acquires the color groups to which the first color, the second color, and the color considered a pattern color respectively belong by using the frequency distribution of the color groups, and when the full-color pattern mode was set, the color setting unit sets the full-color pattern mode on the basis of the acquired color groups.

As a result, the full-color pattern mode can be set with a simpler hardware configuration of the frequency distribution acquisition unit than in the case in which the frequency distribution representing the occurrence rate of each color is acquired by using all of the basic bits.

This application is based on Japanese Patent application Nos. 2010-243986 and 2010-243987 filed in Japan Patent Office on Oct. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:

an image data acquisition unit that acquires image data representing a color image;

a frequency distribution acquisition unit that allocates a color of each pixel of the image data as a class and acquires a frequency distribution representing an occurrence rate of the each color on the basis of the image data acquired by the image data acquisition unit; and a color setting unit that sets a first color that is a color with the highest occurrence rate in the frequency distribution acquired by the frequency distribution acquisition unit as a background color in the color image, sets a second color that is a color with an occurrence rate next in magnitude to the first color as a character color in the color image, and sets a color with an occurrence rate lower than that of the second color as a pattern color that is a color of a specific pattern in the color image.

2. The image forming apparatus according to claim 1, wherein when a determination condition is satisfied that includes as a condition that a difference between a sum of the occurrence rates of predetermined object colors including a third color that is a color with an occurrence rate next in magnitude to the second color, the first color, and the second color, and a total number of pixels of the color image is less than a pattern determination value that has been determined in advance, the color setting unit sets the third color as the pattern color.

3. The image forming apparatus according to claim 2, wherein the object colors include a fourth color that is a color with an occurrence rate next in magnitude to the third color, the third color, the first color, and the second color, the determination condition further includes as a condition that the occurrence rate of the fourth color is less than an additional pattern determination value that has been determined in advance, and the color setting unit sets the third color as the pattern color when all of the conditions included in the determination condition are satisfied.

4. The image forming apparatus according to claim 2, wherein the determination condition further includes as a condition that the occurrence rate of the third color is less than an auxiliary size determination value that has been set in advance, and the color setting unit sets the third color as the pattern color when all of the conditions included in the determination condition are satisfied.

5. The image forming apparatus according to claim 2, wherein the image data acquisition unit represents the color of each of the pixels by density values of three primary colors that have been set in advance, the frequency distribution acquisition unit arranges the colors as the classes on three-dimensional coordinates by allocating each of the density values to each coordinate of three-dimensional coordinates, and generates three-dimensional frequency distribution information in which the frequency distribution is represented in three-dimensional coordinates, by associating each of the colors with the occurrence rate, and the color setting unit sets the third color by excluding colors which are arranged on a path connecting linearly the first color and the second color on three-dimensional coordinates in the three-dimensional frequency distribution information and for which a distance from the first color on the three-dimensional coordinates exceeds a determination distance that has been set in advance and a distance from the second color exceeds the determination distance.

6. The image forming apparatus according to claim 2, wherein the image data acquisition unit represents the color of each of the pixels by density values of three primary colors that have been set in advance and represents each of the density values by the number of basic bits that has been set in advance, the frequency distribution acquisition unit allocates each of high-order bits that have been set in advance in the density values of the primary colors to each coordinate of three-dimensional coordinates, thereby arranging, as the classes, color groups that are groups of colors for which the high-order bits of the primary colors are common on the three-dimensional coordinates, and acquires a frequency distribution of each of the color groups as three-dimensional frequency distribution information by associating each of the color groups with each of the occurrence rates of the color groups, and the color setting unit uses the color groups instead of the colors, and sets a color group to be the third color by excluding color groups of a region obtained by excluding a first region for which a distance from a color group to be the first color on the three-dimensional coordinates is less than a Euclid distance that has been set in advance and a second region for which a distance from a color group to be the second color on the three-dimensional coordinates is less than the Euclid distance, from a region formed by connecting linearly the first region and the second region.

7. The image forming apparatus according to claim 2, further comprising:

an identification information input unit that receives an input of identification information of a user;

a management unit in which identification information of a user that can implement only a monochromatic mode of forming an image based on the image data by only one color has been registered in advance;

a setting unit that receives a setting as to whether to allow an implementation of a single-color pattern mode in which characters in the color image are printed by using a color toner of the second color that has been set by the color setting unit and the pattern is printed by using a color toner of the third color that has been set by the color setting unit, with respect to a user having the identification information of the user that can implement only the monochromatic mode, which has been registered in the management unit; and a control unit that implements image formation in the monochromatic mode and the single-color pattern mode, wherein when the identification information input unit receives an input of identification information of the user that can implement only the monochromatic mode, and when the setting unit receives a setting allowing the implementation of the single-color pattern mode to the user having this identification information, the control unit allows the implementation of the monochromatic mode and the single-color pattern mode to the user that can implement only the monochromatic mode.

8. The image forming apparatus according to claim 2, further comprising an image processing unit that performs background color change processing of changing a background color in the color image to a color that has been determined in advance in the image data.

9. The image forming apparatus according to claim 1, wherein the color setting unit sets a plurality of colors with an occurrence rate lower than that of the second color in the frequency distribution as the pattern color, and determines whether or not to set a full-color pattern mode that is a mode in which the specific pattern is printed by using the pattern color on the basis of the occurrence rates of any color from among the colors with the occurrence rate lower than that of the second color, the first color, and the second color, and the image forming apparatus further comprises a control unit that prints characters in the color image by using a color toner of the second color and prints the specific pattern by using a color toner of the pattern color when the full-color pattern mode set by the color setting unit.

10. The image forming apparatus according to claim 9, wherein the color setting unit sets the full-color pattern mode when a difference between the total number of pixels in the color image and a sum of the occurrence rates of the first color and the second color is less than a size determination value that has been set in advance, and the occurrence rate of a fourth color that is a color with an occurrence rate next in magnitude to a third color having an occurrence rate next in magnitude to the second color is equal to or greater than a multiple color determination value that has been set in advance.

11. The image forming apparatus according to claim 9, wherein the color setting unit sets the full-color pattern mode when a difference between the total number of pixels in the color image and a sum of the occurrence rates of the first color and the second color is less than a size determination value that has been set in advance, the occurrence rate of a fourth color that is a color with an occurrence rate next in magnitude to a third color having an occurrence rate next in magnitude to the second color is less than a multiple color determination value that has been set in advance, and a difference between a sum of the occurrence rates of the first color, the second color, the third color, and the fourth color and the total number of pixels in the color image is equal to or greater than an additional multiple color determination value that has been set in advance.

12. The image forming apparatus according to claim 9, wherein the color setting unit sets the full-color pattern mode when a ratio of a sum of the occurrence rates of the first color and the second color to the total number of pixels in the color image is equal to or greater than a reference ratio that has been set in advance, and the occurrence rate of a fourth color that is a color with an occurrence rate next in magnitude to a third color having an occurrence rate next in magnitude to the second color is equal to or greater than a multiple color determination value that has been set in advance.

13. The image forming apparatus according to claim 9, wherein the image data acquisition unit represents the color of each of the pixels by density values of three primary colors that have been set in advance, the frequency distribution acquisition unit arranges the colors as the classes on three-dimensional coordinates by allocating each of the density values to each coordinate of three-dimensional coordinates, and generates three-dimensional frequency distribution information in which the frequency distribution is represented in three-dimensional coordinates, by associating each of the colors with the occurrence rate, and the color setting unit sets the pattern color on the basis of an order of occurrence rates of colors remaining after excluding colors which are arranged on a path connecting linearly the first color and the second color on three-dimensional coordinates in the three-dimensional frequency distribution information and for which a distance from the first color on the three-dimensional coordinates exceeds a determination distance that has been set in advance and a distance from the second color exceeds the determination distance.

14. The image forming apparatus according to claim 9, wherein the image data acquisition unit represents the color of each of the pixels by density values of three primary colors that have been set in advance and represents each of the density values by the number of basic bits that has been set in advance, the frequency distribution acquisition unit allocates each of high-order bits that have been set in advance in the density values of the primary colors to each coordinate of three-dimensional coordinates, thereby arranging, as the classes, color groups that are groups of colors for which the high-order bits of the primary colors are common on the three-dimensional coordinates, and acquires a frequency distribution of each of the color groups as three-dimensional frequency distribution information by associating each of the color groups with each of the occurrence rates of the color groups, and the color setting unit uses the color groups instead of the colors, and sets the pattern color on the basis of an order of occurrence rates of color groups remaining after excluding color groups of a region obtained by excluding a first region for which a distance from a color group to be the first color on the three-dimensional coordinates is less than a Euclid distance that has been set in advance and a second region for which a distance from a color group to be the second color on the three-dimensional coordinates is less than the Euclid distance, from a region formed by connecting linearly the first region and the second region.

15. The image forming apparatus according to claim 9, wherein the colors of the pixels are represented by density values of cyan, magenta, and yellow, or red, green, and blue, the image forming apparatus further comprises:

an image forming unit that performs image formation by using the cyan, the magenta, and the yellow, or the red, the green, the blue, and a black toner; and an undercolor removal unit that replaces, with black, a portion corresponding to gray among the density values in the pixels, and the undercolor removal unit performs 100% UCR processing of replacing the second color with the black when the full-color pattern mode is set by the color setting unit.

16. The image forming apparatus according to claim 9, further comprising:

an identification information input unit that receives an input of identification information of a user;

a management unit in which identification information indicating a monochromatic-restricted user, which is a user that can implement only a monochromatic mode, has been registered in advance; and a first setting unit that receives a setting as to whether to allow an implementation of the full-color pattern mode to the monochromatic-restricted user, wherein when the first setting unit receives a setting allowing the implementation of the full-color pattern mode to the monochromatic-restricted user and the identification information input unit receives an input of identification information indicating the monochromatic-restricted user, the control unit allows the implementation of the monochromatic mode and the full-color pattern mode to the monochromatic-restricted user.

17. The image forming apparatus according to claim 10, further comprising a second setting unit for setting at least the size determination value.

18. The image forming apparatus according to claim 12, further comprising a third setting unit for setting at least the reference ratio.

19. The image forming apparatus according to claim 9, further comprising an image processing unit that performs background color change processing of changing the background color to a predetermined color in the image data.

20. The image forming apparatus according to claim 9, wherein the image data acquisition unit represents the color of each of the pixels by density values of three primary colors that have been set in advance and represents the density values by the number of basic bits that has been set in advance, the frequency distribution acquisition unit acquires the frequency distribution by taking, as the classes, the color groups that are groups of colors for which high-order bits that have been set in advance in the number of basic bits of the density values are common for each of the primary colors, and the color setting unit uses the color groups instead of the colors to determine whether or not to set the full-color pattern mode on the basis of occurrence rates of any color group from among a plurality of color groups with an occurrence rate lower than that of the second color group which is the color group with the second highest occurrence rate in the frequency distribution, the first color group which is the color group with the highest occurrence rate, and the second color group, and when the full-color pattern mode was set, the color setting unit sets, as the pattern colors, a plurality of colors obtained by selecting respective colors with the highest occurrence rate in respective color groups with an occurrence rate lower than that of the second color group.

* * * * *